US008066467B2

(12) United States Patent
Hammonds

(10) Patent No.: US 8,066,467 B2
(45) Date of Patent: Nov. 29, 2011

(54) OMNI-DIRECTIONAL TOWBARLESS AIRCRAFT TRANSPORTER FOR MOVING AIRCRAFT

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 931 days.

(21) Appl. No.: 11/872,620

(22) Filed: Oct. 15, 2007

(65) Prior Publication Data
US 2008/0089766 A1    Apr. 17, 2008

Related U.S. Application Data

(60) Provisional application No. 60/851,866, filed on Oct. 13, 2006.

(51) Int. Cl.
  *B64C 25/50* (2006.01)
(52) U.S. Cl. .......................... 414/429; 244/50
(58) Field of Classification Search ................. 414/429, 414/589; 244/50
  See application file for complete search history.

(56) References Cited

U.S. PATENT DOCUMENTS

| 4,516,744 | A |   | 5/1985  | Burnside          |         |
|-----------|---|---|---------|-------------------|---------|
| 4,632,625 | A |   | 12/1986 | Schuller et al.   |         |
| 5,110,067 | A | * | 5/1992  | Sinkkonen         | 244/50  |
| 5,259,572 | A |   | 11/1993 | Franken et al.    |         |
| 5,328,192 | A | * | 7/1994  | Thompson          | 280/47.24 |
| 5,336,037 | A | * | 8/1994  | Curten et al.     | 414/429 |
| 5,480,274 | A |   | 1/1996  | Franken et al.    |         |
| 5,549,436 | A | * | 8/1996  | Fresia            | 414/426 |
| 6,109,644 | A | * | 8/2000  | Cox               | 280/652 |
| 6,581,203 | B1 |  | 6/2003  | Hammonds          |         |
| 6,739,822 | B2 | * | 5/2004  | Johansson         | 414/427 |
| 6,830,114 | B2 |  | 12/2004 | Hammonds          |         |
| 6,860,345 | B2 |  | 3/2005  | Hammonds          |         |
| 7,258,181 | B2 | * | 8/2007  | Hammonds          | 180/6.48 |
| 2005/0184484 | A1 | | 8/2005 | Johns et al.       |         |
| 2006/0037787 | A1 | | 2/2006 | Hammonds           |         |

FOREIGN PATENT DOCUMENTS
JP    62-283072    12/1987

OTHER PUBLICATIONS

European Supplemental Search Report of counterpart European patent application No. 07872795.5 dated Nov. 12, 2009.
Salim R. Taleb, Office Action of Feb. 22, 2011—Canadian Appl. 2669566, Feb. 22, 2011, 3 pages, Canadian Intellectual Property Office.

* cited by examiner

*Primary Examiner* — Charles A Fox
(74) *Attorney, Agent, or Firm* — James E. Hudson, III; Crain, Caton & James, P.C.

(57) ABSTRACT

An apparatus for moving parked aircraft with an omni-directional tractor via an aircraft lift dolly that is revolvably coupled thereto. The aircraft lift dolly may be removably coupled to the omni-directional tractor or may be integral to it. The aircraft lift dolly includes a lift mechanism having a lift carriage which is selectively elevated. The lift carriage includes a fixed forward chock and a rear chock that moves longitudinally and laterally with respect to the forward chock. The chocks are positioned about the aircraft nose gear without movement of the aircraft. Elevating the lift cradle elevates the chocks and the nose gear cradled therebetween.

19 Claims, 15 Drawing Sheets

OMNI-DIRECTIONAL TOWBARLESS AIRCRAFT TRANSPORTER FOR MOVING AIRCRAFT

CROSS REFERENCE TO RELATED APPLICATION

This application is based upon provisional application 60/851,866 filed on Oct. 13, 2006, the priority of which is claimed.

BACKGROUND OF THE INVENTION

1. Field of the Invention

The invention relates generally to a wheeled vehicle designed to move parked aircraft. In particular, the invention relates to towbarless aircraft transport vehicles that move aircraft by lifting the nose landing gear clear of the ground to move the aircraft without the use of connected tow bars.

2. Description of the Prior Art

Aircraft transport tractors commonly employ an attached towbar that is used to engage nose gear of aircraft to push or pull the aircraft. The aircraft landing gear remain on the ground at all times during transport by a conventional towbar-type aircraft transport tractor. However, towbarless aircraft transport vehicles, which lift aircraft nose gear up off of the ground, are also in use. Towbarless tractors are designed to eliminate all but one pivot point to reduce turn limit damage, eliminate jackknifing, and provide increased maneuverability.

FIG. 1 shows a typical towbarless aircraft transport tractor (1) of prior art. The tractor (1) utilizes a scoop or bucket (2) that lays flat on the ground and receives the aircraft landing nose gear wheels. A harness (3) is secured to the aircraft, and the aircraft is pulled into the bucket by a winch located on the tractor. Once the aircraft is winched into the bucket tightly against the bucket wall (4), the bucket is raised and tilted rearward, securing the aircraft and making it possible to tow. As a result of the tilting of the bucket, the geometry of the landing gear may have a forward rake angle, which may place the nose gear in a bind when the aircraft, and hence the nose gear, are turned sharply.

Other lift designs may be used to lift aircraft nose gear for transport. For instance, a scoop or receiver bucket may be placed in front of the aircraft wheels and a set of arms with either powered wheels or free wheeling wheels are placed behind the landing gear wheels. The rearward placed rollers are then pulled forward forcing the aircraft wheels to roll forward into the receiver portion of the device. When the aircraft is secured against the front portion of the receiver, the landing gear wheels are raised and can be transported. Other devices may employ winching devices that winch the aircraft landing gear forward onto a lazy susan turntable. The swiveling turntable allows the tractor to maneuver the aircraft with less steering of the aircraft nose landing gear, and thus less risk of binding the nose gear.

Towbarless aircraft transport tractors of prior art (1) all require that the aircraft be moved from its original position to be captured in the lifting bucket, for example by being winched forward by a harness. Because other equipment may be attached to the aircraft during aircraft servicing, the process of capturing the aircraft into the bucket may need to be deferred until the aircraft is completely free to be moved, thus minimizing the amount of preparation and pre-staging of the transport tractor that may be accomplished and increasing overall transport time. It is therefore desirable to have an aircraft lift mechanism that does not require the aircraft to be moved during the cradling process.

Furthermore, the harness must be manually attached to and released from the aircraft as part of the transport process, which increases transport time and effort. Therefore, it is desirable to have an aircraft lift mechanism that allows an operator to completely cradle and release the aircraft nose gear from the operators seat of the aircraft transport tractor.

Towbarless aircraft transport tractors (1) of prior art are typically four-wheeled vehicles with fixed drive wheels (5) located at the lifting end of the tractor and steerable wheels (6) located at the opposite end. The fixed wheels (5) are powered and provide tractive force for the tractor (1) and towed aircraft. The weight of the aircraft acts downwardly close to the drive wheels and helps to provide traction.

The two steerable wheels (6) simultaneously pivot within a limited angular range. Because there is a fixed distance between the fixed wheel axle and the steerable wheel axle, a turning radius exists that far exceeds the space actually occupied by the vehicle itself. The longer the distance between axles, the larger the turning radius that is required to change directions of the vehicle. A large turning radius makes maneuvering around tight areas difficult and often dangerous. In an area where movement is constrained, a vehicle with a small turn radius is advantageous. Any increase in maneuvering efficiency and safety generally amounts to significant cost savings. It is desirable, therefore, to have a vehicle with greater maneuverability to enhance the safety of the operator, the aircraft, and the surrounding environment.

Furthermore, towbarless aircraft transport tractors (1) of prior art are single-use specialized vehicles characterized by an integral aircraft lift mechanism. As tractors are used in a number of aircraft servicing operations, such as for towing baggage carts or moving aircraft with conventional towbars, it is advantageous to use a common tractor design that can perform numerous services. Interoperability of tractors reduces capital costs, improves redundancy, and provides operational flexibility. Therefore, it is desirable to incorporate an aircraft lift mechanism in a dolly that can be removably coupled with a multi-purpose tractor.

3. Identification of Objects of the Invention

A primary object of the invention is to provide a towbarless aircraft transport vehicle that maneuvers an aircraft with the utmost precision, making it possible to place the aircraft in congested ramps and hangers with less space required for maneuvering.

Another object of the invention is to provide a towbarless aircraft transport vehicle that reduces the labor required to operate the vehicle and connect to aircraft.

Another object of the invention is to provide a towbarless aircraft transport vehicle that reduces the possibility of injury to personnel and aircraft while towing aircraft.

Another object of the invention is to provide a towbarless aircraft transport vehicle that reduces the stresses placed on the aircraft landing gear, for example by loading the nose gear in the direction of travel during transport.

Another object of the invention is to provide a towbarless aircraft transport vehicle that captures the aircraft for transport without moving the aircraft from its original position over the ground, with the only movement being lifting the nose gear straight up prior to movement.

Another object of the invention is to provide a tractor attachment that is capable of performing lifted aircraft towing and handling and which can be easily decoupled from the tractor, allowing the basic tractor to be used for other purposes such as using a conventional tow bar, powering a sweeper, or moving snow with a snow plow attachment.

SUMMARY OF THE INVENTION

In a first embodiment of the invention, one or more of the objects described hereinbefore and other advantages and features of the invention are incorporated in a aircraft transport vehicle consisting essentially of an omni-directional tractor having an accessory aircraft lift and transport dolly tool revolvably connected thereto. The omni-directional tractor provides superior maneuvering capability and the towbarless aircraft lift dolly minimizes stresses imparted to the towed aircraft nose gear.

In one variation, the omni-directional tractor is removably coupled to the aircraft lift dolly, allowing the omni-directional tractor to be used with other accessory tools, such as with baggage carts, conventional towbars, sweepers, or snow plows. In another variation, the omni-directional tractor and aircraft lift dolly are integral, forming a specialized aircraft transport vehicle.

The aircraft lift dolly may include a handling mechanism that lowers handling wheels to lift the rear dolly wheels up off the ground. The handling wheels are oriented perpendicular to the dolly longitudinal axis. By pinning the lift dolly to the omni-directional tractor so that no rotation occurs therebetween, the entire transport vehicle can be made to move transversely to the dolly longitudinal axis or to rotate about the omni-directional tractor vertical axis.

In a second embodiment of the invention, one or more of the objects described hereinbefore and other advantages and features of the invention are incorporated in vehicle in which the aircraft lift dolly is combined with either an omni-directional tractor or a conventional four-wheeled tractor. In one variation, the aircraft lift dolly is removably coupled to the tractor, and in another variation, the aircraft lift dolly is integral with the tractor. The aircraft lift dolly includes a lift mechanism that cradles the aircraft without requiring the aircraft to be moved over the ground.

The aircraft lift mechanism includes a lift carriage and forward chock that can be selectively raised with respect to the transport vehicle. The lift carriage carries a rear chock, which can be moved longitudinally and laterally with respect to the forward chock. In operation, the aircraft transport vehicle is driven to the lifting position where the front aircraft nose gear abuts the forward chock. The rear chock is then moved to abut the rear of the nose gear. The lift carriage is elevated, raising the forward and rear chocks and the nose gear cradled therebetween. Thus, the aircraft can be cradled and lifted without moving the aircraft on to a lift bucket.

The aircraft lift dolly may include a handling mechanism that lifts the forward end of the dolly from the ground to facilitate coupling or uncoupling the dolly from the tractor. The aircraft lift dolly may also telescopically extend along its longitudinal axis to provide greater flexibility in handling aircraft.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

In describing aircraft transport vehicles herein, a convention is adopted that when referring to the aircraft lift dolly 100, the terms "forward" or "front" refer to that portion of the dolly 100 that faces the same direction as the aircraft's compass heading when the aircraft is carried by the vehicle 10, and left and right designations match the aircraft's left and right sides, respectively, regardless of the direction of travel, the direction the operator is facing, or the orientation of the omni-directional tractor 8. However, when referring to the omni-directional tractor 8, left, right, front and back references match that of the operator's left, right, front and back, respectively.

Figure 1:
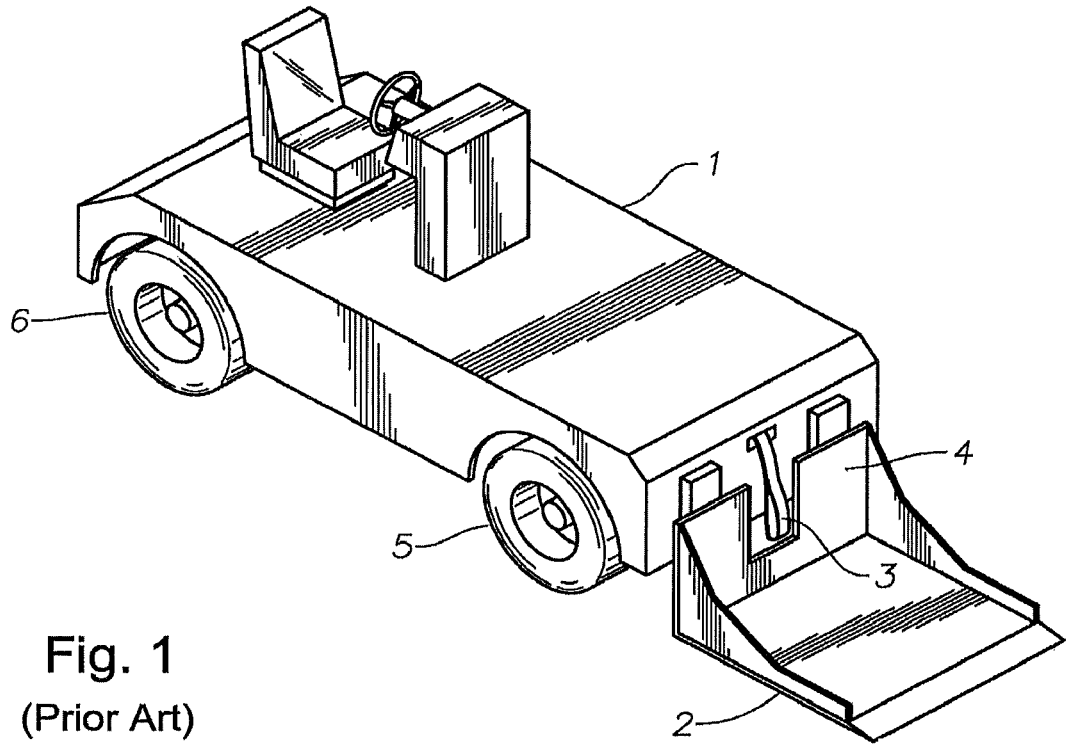
FIG. 1 is an isometric perspective view of a towbarless aircraft transport tractor of prior art showing a conventional four-wheeled tractor equipped with a bucket for receiving and lifting the nose gear of an aircraft and a harness for winching the aircraft nose gear on to the bucket.
Figure 1A:
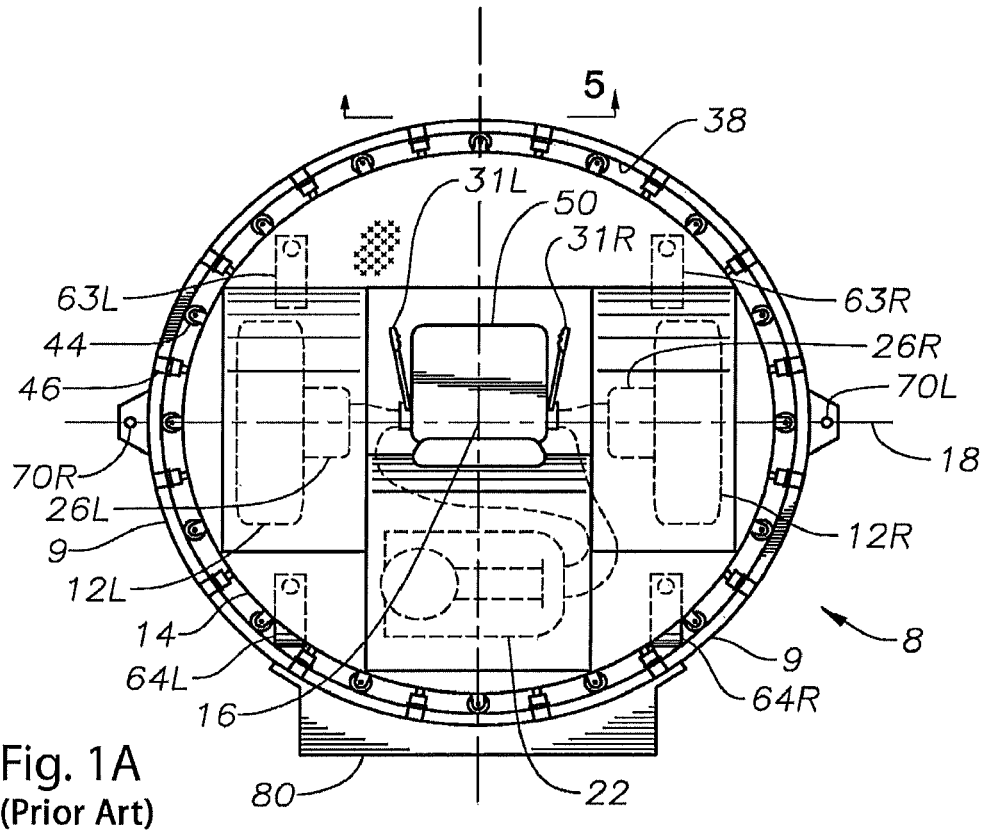
FIG. 1A is a plan view of a prior art omni-directional tractor or omni-directional vehicle (ODV).
Figure 2:
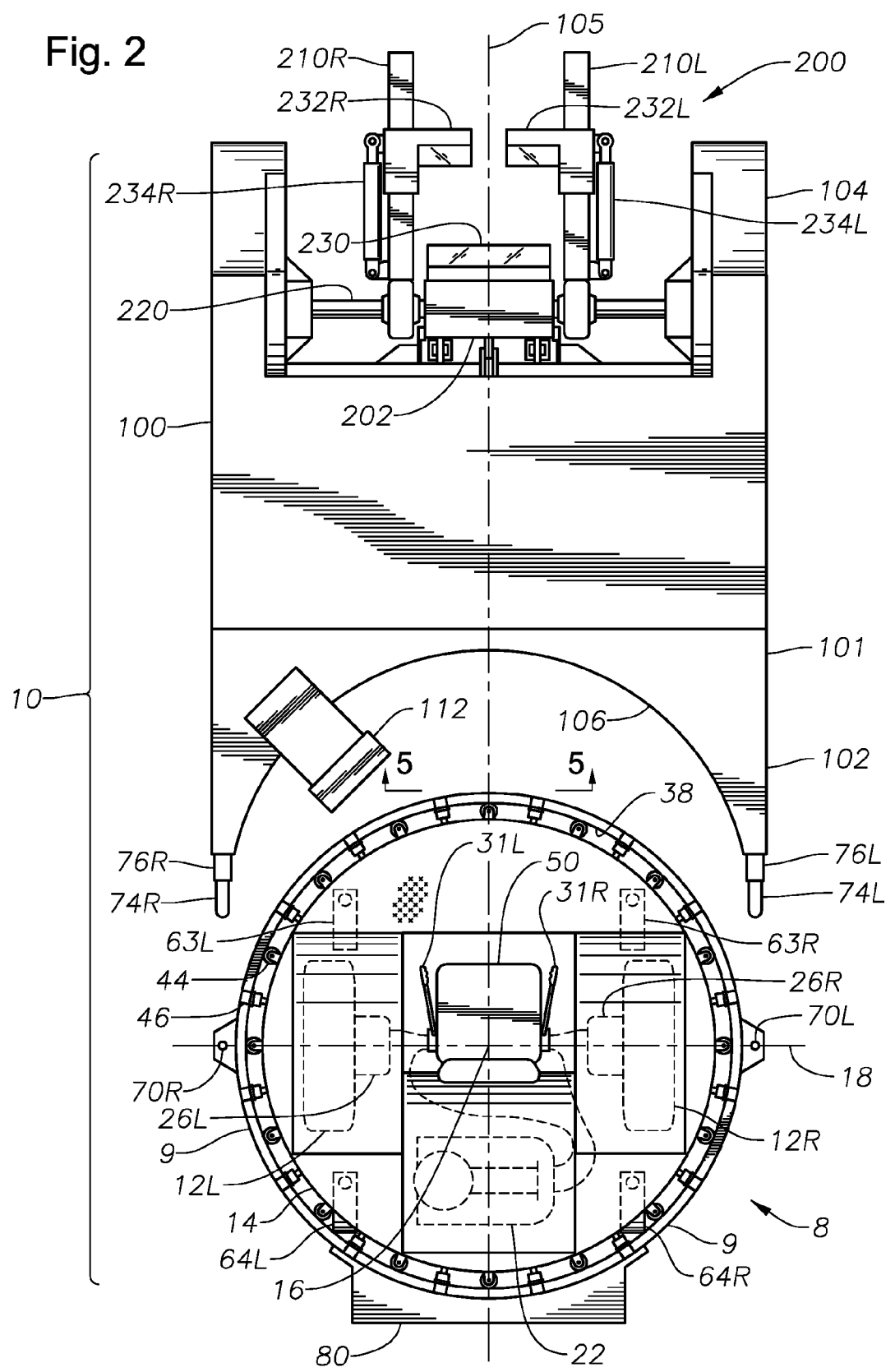
FIG. 2 is a plan view of an aircraft transport vehicle according to a preferred embodiment of the invention showing an omni-directional tractor and an aircraft lift dolly that is removably and revolvably connectable to the tractor.
Figure 3:
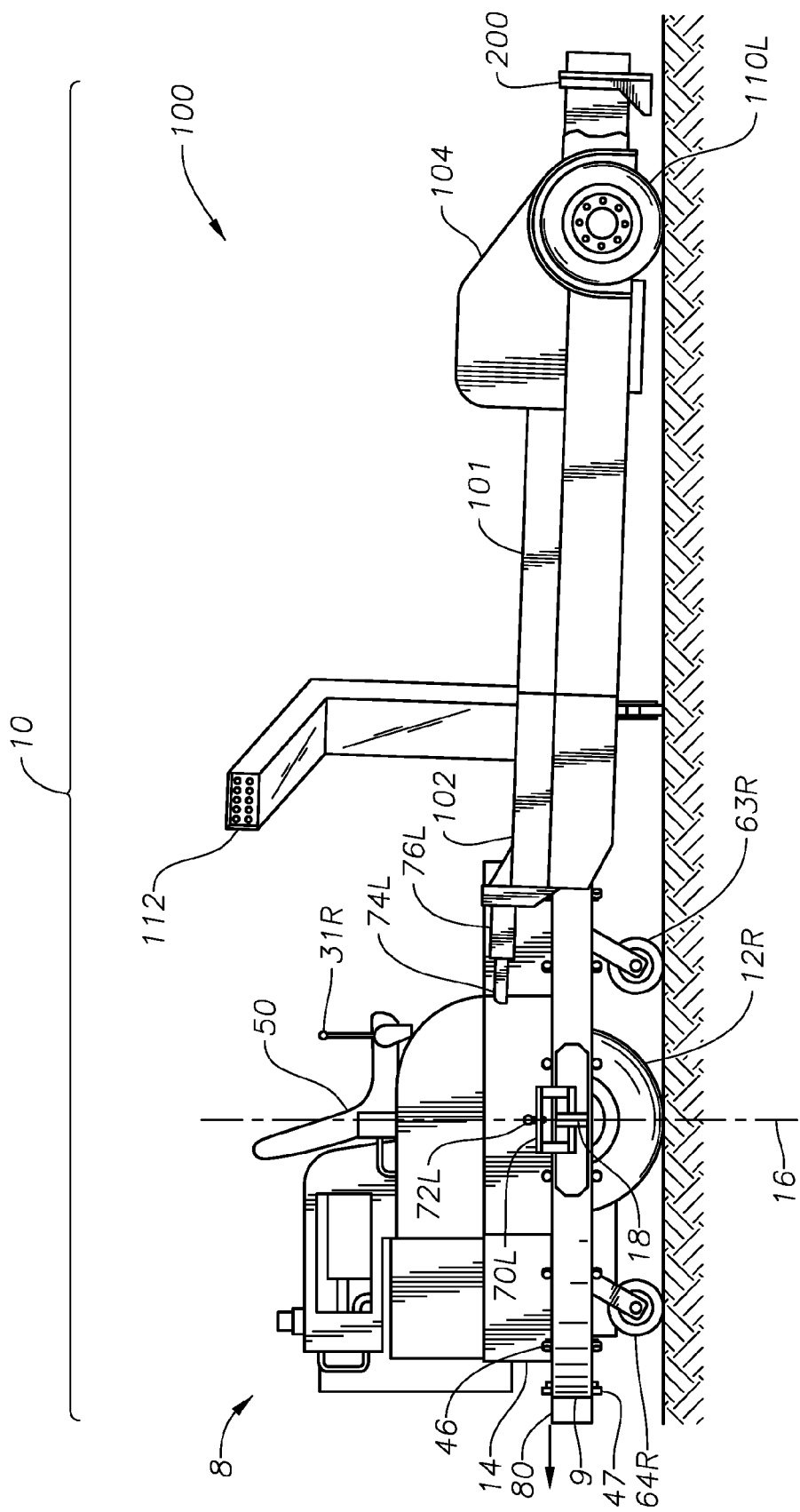
FIG. 3 is a left side elevation view of the aircraft transport vehicle of FIG. 2.

Referring to FIGS. 2-3, according to a preferred embodiment of the invention, the aircraft transport vehicle 10 includes an omni-directional vehicle (ODV) 8 that is revolvably coupled to a dolly 100 equipped with an aircraft lift assembly 200 for elevating the nose gear of an aircraft. U.S. Pat. No. 6,581,703, issued to Hammonds and entitled "Omni Direction Vehicle" teaches one how to make and use an ODV having a circular perimeter and a zero turn radius; it is incorporated herein in its entirety by reference.

ODV 8 preferably includes a circular frame 14, about which dolly 100 is revolvably mountable. As shown by hidden lines in FIG. 2, ODV 8 includes a power source 22 mounted to the frame 14 and first and second drive wheels 12L, 12R rotatively coupled to the frame 14, and one or more swivel casters carried at the underside of frame 14 to support ODV 8 on the ground and prevent it from toppling. Preferably, four swivel casters 63R, 63L, 64R, 64L are used, as discussed in detail hereinafter. An operator seat 50 is coupled to frame 14 near the center of the ODV 8.

The drive wheels 12L, 12R are disposed along and rotate about a horizontal axis 18. When drive wheels 12L, 12R are rotated in opposite directions at the same speed, they revolve 360 around a vertical axis 16. Drive wheels 12L, 12R are independently driven by first and second motors 26L, 26R, which are powered by power source 22. Power source 22 may be a battery or an internal combustion engine and hydraulic pump, for example, and motors 26L, 26R may be electric or hydraulic motors. First and second control levers 31L, 31R, located on either side of operators seat 50, are operatively coupled to and control the speed and direction of the first and second drive wheels 12L, 12R, respectively.

In a preferred embodiment of the invention, ODV 8 includes dual forward swivel casters 63R, 63L, which are mounted on articulated linkages that are supported by dual air bags. Under normal operating, casters 63R, 63L do not support any of the weight of tractor 8 and are mounted in a position just clear of the ground. When the forward-moving vehicle suddenly stops or turns, the air suspension of front casters 63R, 63L stabilizes the tractor 8 much like an automobile suspension, absorbing energy caused by the weight of the tractor shifting forward. The air bags are adjustable in stiffness by a control located in the tractor instrument panel and can be set as stiff or soft, depending on the smoothness of the surface on which ODV 8 is operating.

ODV 8 is weighted so that the center of gravity is located behind the drive wheel horizontal axis 18. ODV 8 preferably includes dual rear casters 64R, 64L, which support the rear-heavy ODV 8 and keep it from toppling over when operating independently of dolly 100. Unlike forward casters 63R, 63L, rear casters 64R, 64L are preferably not mounted on an air suspension.

Aircraft dolly 100 includes a frame 101 having a forward end 102 that revolvably mounts to ODV 8 and a rear end 104 that carries an aircraft lift mechanism 200 that is designed and arranged to lift the nose gear of an aircraft having tricycle-style landing gear. Dolly 100 preferably includes wheels 110R, 110L located near the rear end 104 of dolly 100 to support the weight of the carried aircraft. Ideally, wheels 110R, 110L carry approximately sixty percent of the loaded dolly weight, with ODV 8 carrying the remaining forty percent.

Preferably, storage batteries, an independent hydraulic power unit and solenoid controls are located inside compartments (not illustrated) formed within the body of dolly 100, thus obviating the need for transferring power from ODV 8 to dolly 100. Switches for controlling the functions of all hydraulic powered components of aircraft lift mechanism are located in an operators console 112 located at forward end 102 within easy reach of the operator, making it possible to operate dolly 100 entirely from ODV seat 50 and thus requiring less labor for attachment and detachment of aircraft. Preferably, console 112 is offset to one side of the longitudinal centerline 105 of aircraft transport tractor 10 so as not to obstruct an operator's view of the aircraft nose gear during transport.

According to one embodiment of the invention, the aircraft lift mechanism may be any suitable lift mechanism, including prior art lift mechanisms such as those described hereinbefore which require that the aircraft be winched or pulled on to a bucket or cradle. The combination of ODV 8 with a prior art aircraft lift mechanism provides increased maneuverability over a conventional four-wheeled tractor carrying the same lift mechanism. It is preferred, however, that a lift mechanism 200, as described hereinafter with reference to FIGS. 13-20, be used with dolly 100 and/or ODV 8.

Referring to a preferred embodiment of FIGS. 2-3, ODV 8 is equipped with a circumferential revolvable appendage ring 9, which surrounds ODV circular frame 14. The inner diameter of appendage ring 9 is defined by a bearing race 38. The bearing race may be integral to appendage ring 9 or may be a separate member that is rigidly attached to the inside of appendage ring 9. The bearing race 38 provides smooth surfaces for receiving and revolvably coupling ODV 8, which preferably has a plurality of vertical and horizontal rollers 44, 46, 47 that engage and rotatably capture bearing race 38 in both vertical and horizontal directions with substantially no looseness. The mounting positions of the rollers generally match the curvature of the bearing race 38, thus allowing the bearing race 38 (and attached appendage ring 9) to rotate smoothly with minimal friction and resistance about the ODV 8. Preferably, the rollers are evenly circumintervaled, or circuminterspersed, about the perimeter of the ODV 8, but the number, size, and placement of the rollers may vary depending on the design loads. The revolvable coupling assembly, including rollers 44, 46, 47 and bearing race 38, should preferably be completely circumferential to help evenly distribute loads and minimize point-loading-induced stresses, friction, and coupling failures. The rollers may be equipped with ball bearings to provide smooth rotation under load. Alternatively, other circumferential coupling arrangements may be used to revolvably couple appendage ring 9 to ODV 8. For instance, a bearing race may be rigidly attached to the ODV frame 14 and the engaging rollers may be intervaled within and attached to the appendage ring 9. U.S. patent application Ser. No. 11/363,979 filed on Feb. 28, 2006 in the name of Hammonds and entitled "Omni-Directional Vehicle with Full Circumferential Revolvable Hitch" teaches one how to make and use an ODV with a revolvable appendage ring; it is incorporated herein by reference in its entirety.

Figure 4:
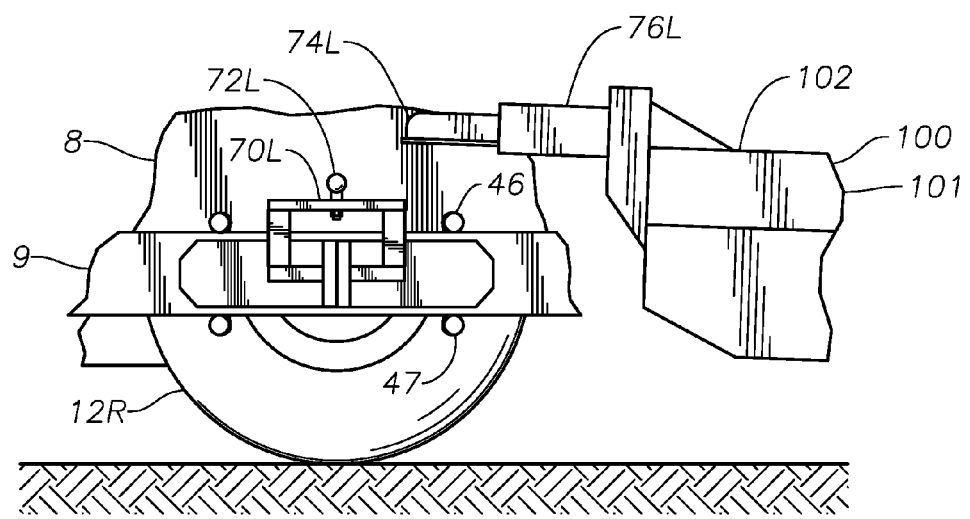
FIG. 4 is a left side elevation detailed view of a hitch assembly for coupling the aircraft lift dolly to the omni-directional tractor.

Appendage ring 9 serves as a point of attachment for aircraft lift dolly 100. Two hitches 70R, 70L, located 180 degrees from each other about appendage ring 9, are preferably used to selectively and quickly couple and uncouple aircraft lift dolly 100 to ODV 8. FIG. 4 shows detail of left hitch 70L of FIGS. 2 and 3. Referring to FIGS. 2-4, each hitch 70R, 70L preferably includes a ball 72R, 72L mounted to appendage ring 9; a complimentary socket 74R, 74L, mounted on a tang 76R, 76L on the forward end 102 of aircraft lift dolly 100, connects to ball 72R, 72L. To couple dolly 100 to appendage ring 9, the forward end 102 of dolly 100 is initially elevated so that sockets 74R, 74L are higher than balls 72R, 72L. ODV 8 is driven into a circular profile 106 in the forward end 102 of dolly 100, with appendage ring 9 oriented so that the balls 72R, 72L are located directly below sockets 74R, 74L. The forward end 102 of dolly 100 is then lowered, so that sockets 74R, 74L receive balls 72R, 72L and are locked thereto in a manner similar to that of an ordinary boat trailer, for example. Hitch arrangements other than ball and socket may also be used as appropriate. The hitch arrangement of FIGS. 2-4 provides a full gimbal mount that allows free rotation of dolly 100 with respect to ODV 8 while simultaneously allowing independent vertical pivoting of ODV 8 and dolly 100 for negotiating uneven ground surfaces.

Figure 5:
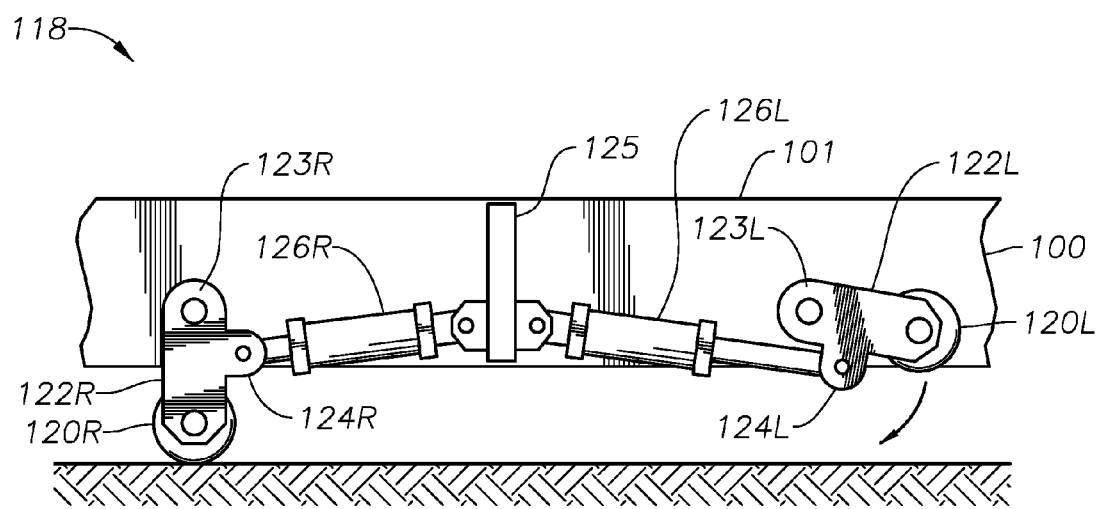
FIG. 5 is a detailed front elevation view of the aircraft lift dolly of FIGS. 2 and 3 taken along lines 5-5 of FIG. 2 showing a dolly handling mechanism, in both the engaged and disengaged positions, for elevating the aircraft lift dolly.

FIG. 5 shows a dolly handling assembly 118 that is used to lift the front end 102 of dolly 100 from the ground, making it possible to elevate sockets 74R, 74L to simplify connection to and disconnection from the omni-directional tractor 8. In a preferred embodiment, handling assembly includes left and right handling wheels 120L, 120R that are rotatively connected to distal ends of left and right bell cranks 122L, 122R. Bell cranks 122L, 122R are pivotally connected at their medial ends 123L, 123R to the frame 101 of dolly 100. Pivoting of bell cranks 122L, 122R causes handling wheels 120L, 120R to move between the downward engaged and upward disengaged positions. Left and right actuators 126L, 126R are connected between frame 101 and left and right bell cranks 122L, 122R. Actuators 126L, 126R are preferably hydraulic piston-cylinder rams, which have their cylinder ends pivotally mounted to bracket 125 fixed to the frame 101 at centerline 105 (FIG. 2) and their piston ends pivotally connected to arms 124L, 124R on bell cranks 122L, 122R, respectively. Lowering handling wheels 120L, 120R (to the position as shown on the left side of FIG. 5) raises the forward end of dolly 100 as shown in FIG. 3, so that ODV 8 may be driven into and out of coupling position with respect to dolly 100. To couple dolly 100 to ODV 8, handling wheels 120L, 120R are raised (to the position as shown on the right side of FIG. 5) so that sockets 74R, 74L are lowered over balls 72R, 72L, respectively. Once mated, sockets 74R, 74L are locked on to balls 72R, 72L.

Figure 6:
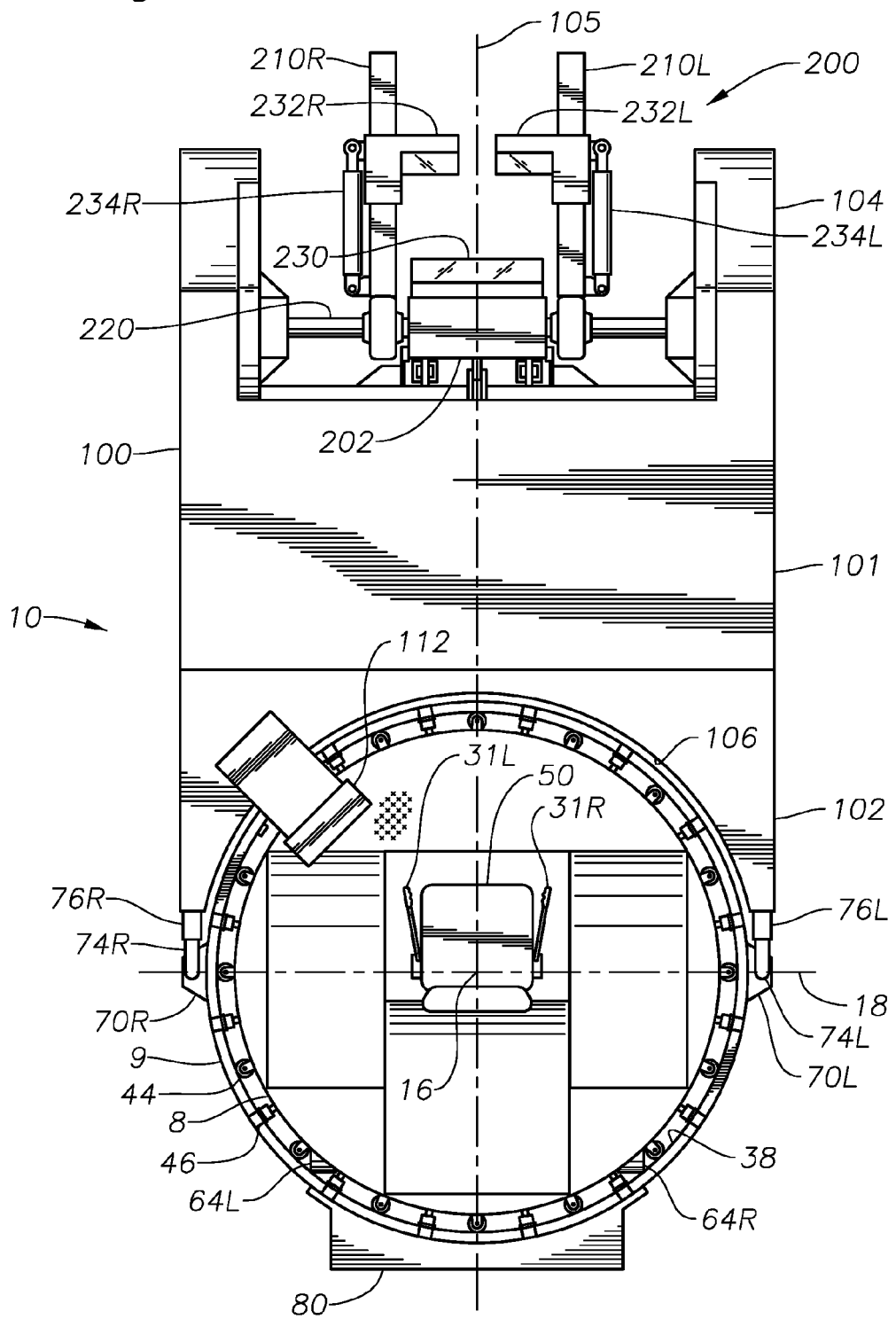
FIG. 6 is a plan view of the aircraft transport vehicle of FIG. 2 shown with the omni-directional tractor coupled to the aircraft lift dolly to create a single, harmonious aircraft transport system.
Figure 7:
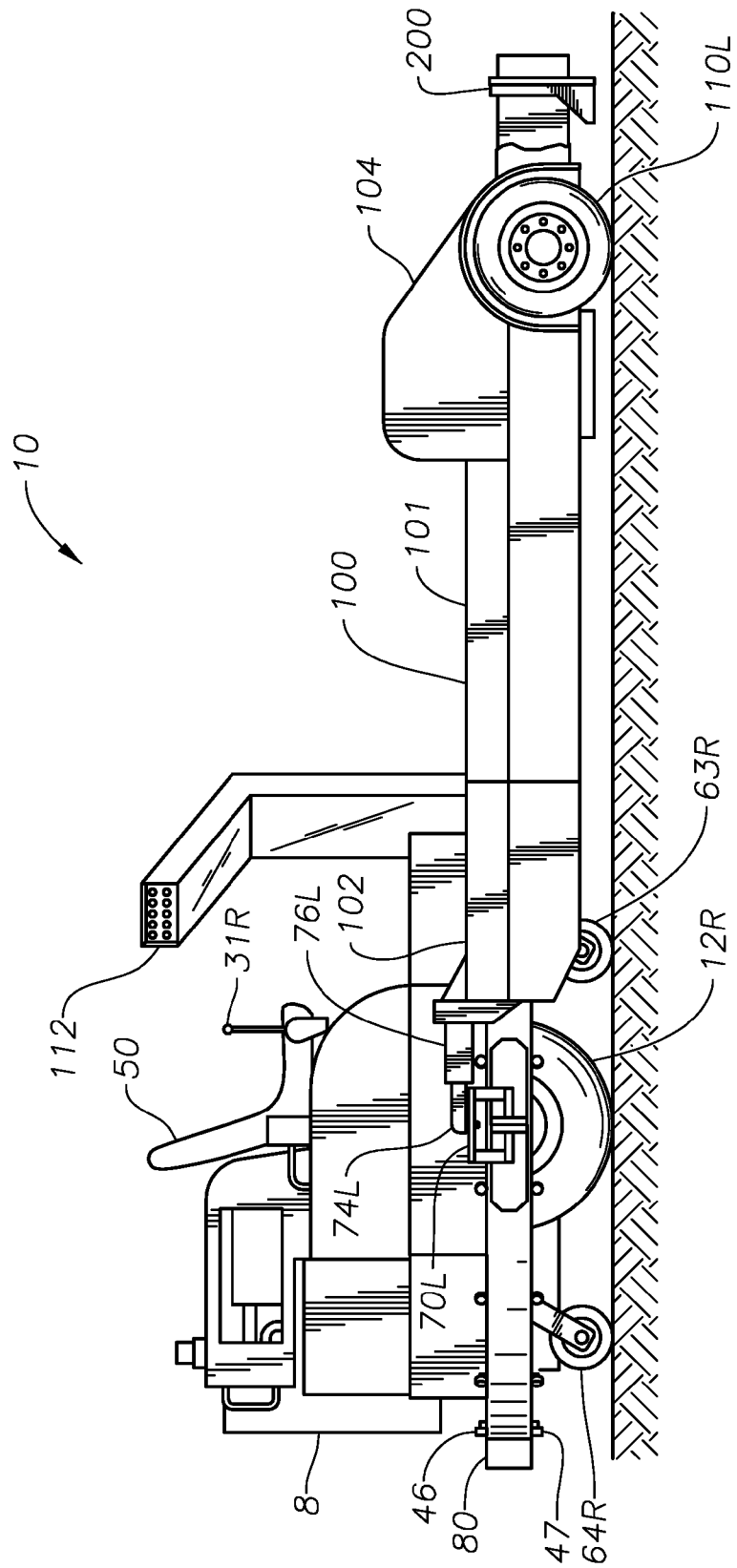
FIG. 7 is a left side elevation view of the coupled aircraft transport vehicle of FIG. 6.
Figure 8:
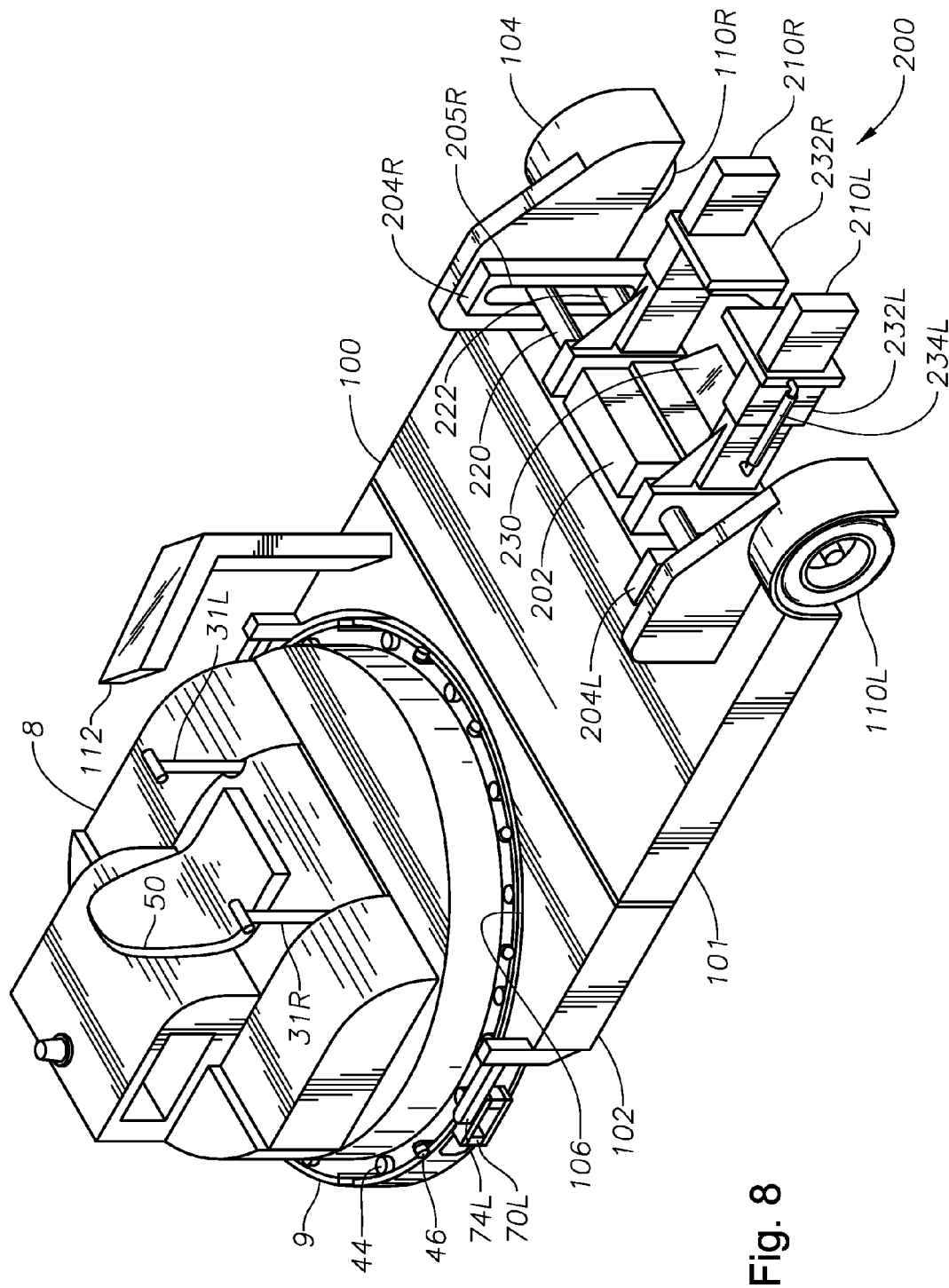
FIG. 8 is an isometric perspective view of the coupled aircraft transport vehicle of FIG. 6.

FIGS. 6-8 show dolly 100 coupled to ODV 8 by hitches 70R, 70L to form a complete aircraft transport tractor 10. Once connected, dolly 100 and ODV tractor 8 become a single system and operate in harmony to maneuver aircraft lift assembly 200 in position to receive and handle aircraft landing gear. Because aircraft lift dolly 100 can be quickly and easily coupled to and uncoupled from ODV 8, ODV 8 can be used with other accessories or to perform other tasks, such as moving aircraft with conventional towbars, pulling baggage carts, or plowing snow, for example. Preferably, appendage ring 9 includes a mount 80 that can be used for other accessories (not shown). Interoperability of ODVs and accessory tools reduces capital expense and maintenance costs, improves reliability, and provides operational flexibility, because fewer specialized tractor vehicles are necessary.

ODV 8 preferably includes a pin 109 that can be selectively engaged between ODV frame 14 and appendage ring 9 by the operator. When pin 109 is disengaged, appendage ring 9 is freely revolvable about ODV frame 14, and when pin 109 is engaged, appendage ring is held stationary with respect to ODV frame 14. Locking pin 109 is ideally connected to a flexible control cable that leads to a handle near operators seat 50, making it possible for the operator to conveniently lock the appendage ring 9 stationary. In some instances, it may be preferable to lock ring 9, such as when ODV 8 is separated from the dolly 100 and is being used to tow ground equipment with towbars, for example. With appendage ring 9 locked, objects may be towed from the front or rear of ODV 8, and precise movement of the towed object is provided by drive wheels 12R, 12L.

Figure 9:
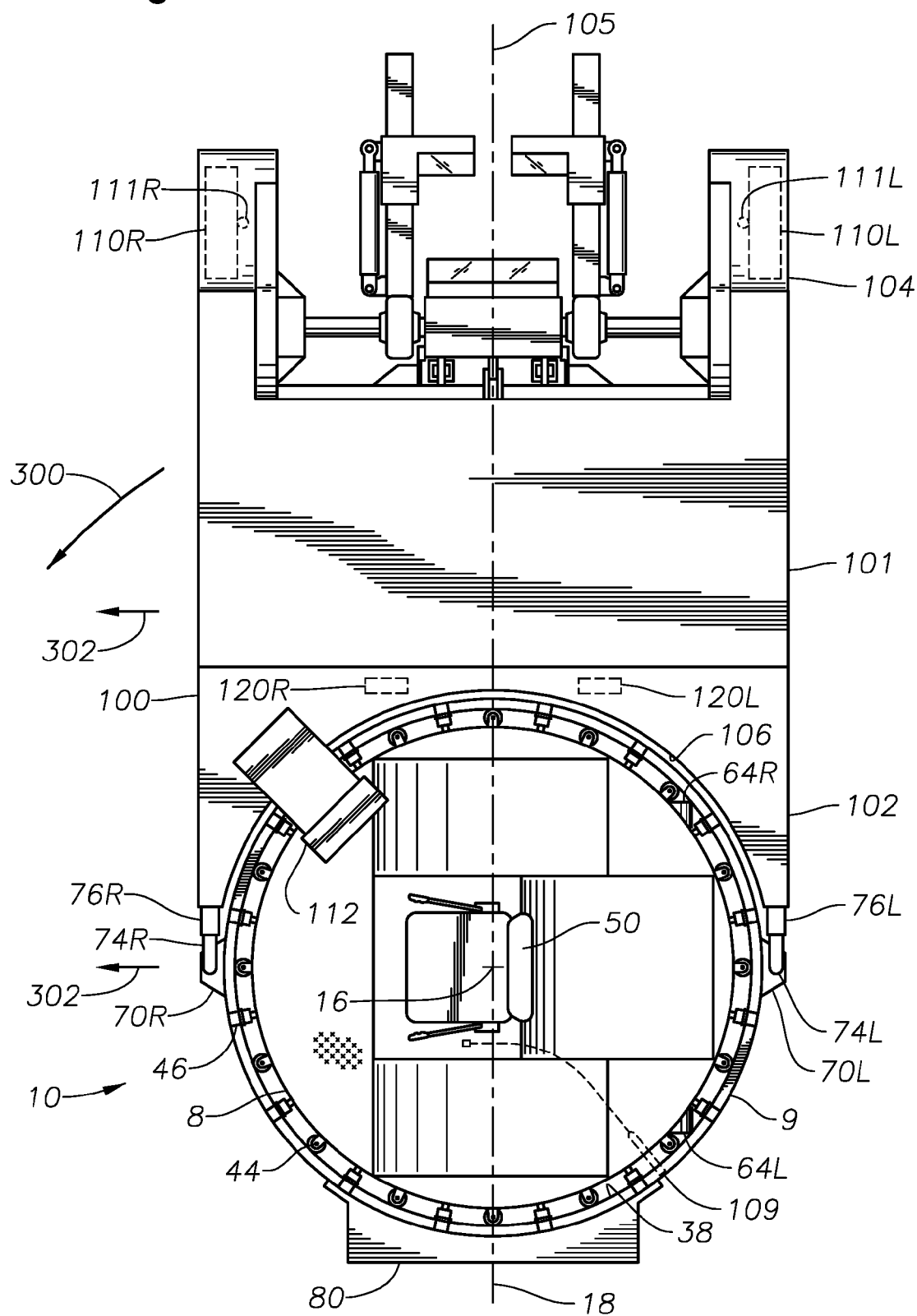
FIG. 9 is a plan view of the coupled aircraft transport vehicle of FIG. 6 shown with the omni-directional tractor oriented perpendicular to the longitudinal axis of the vehicle and with dolly handing wheels deployed so that the entire vehicle can be moved transversely or rotated about the omni-directional tractor vertical axis.
Figure 10:
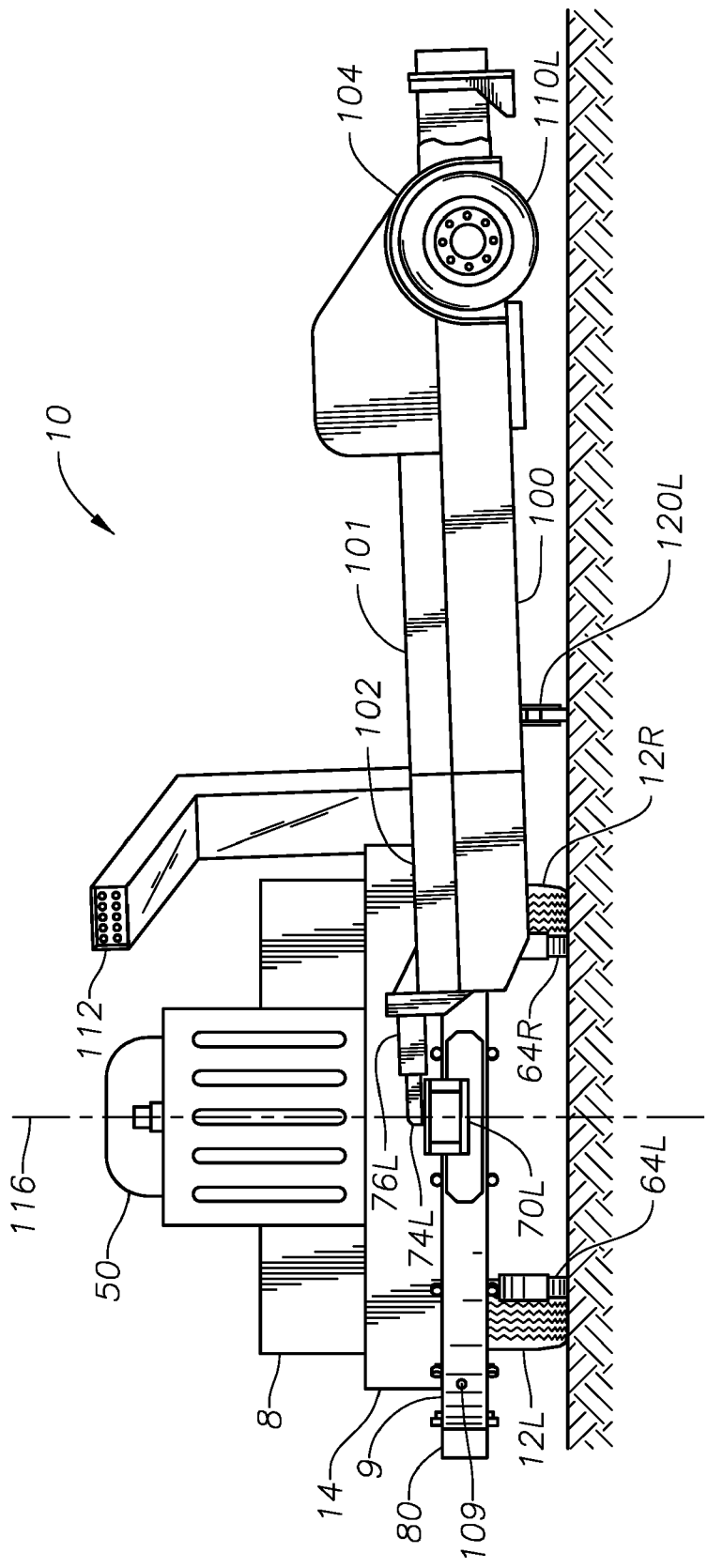
FIG. 10 is a left side elevation view of the coupled aircraft transport vehicle of FIG. 9 showing dolly handing wheels deployed to lift the rear end of the aircraft lift dolly and the dolly wheels clear of the ground.

In addition to raising the front end of dolly 100 for coupling to and decoupling from ODV 8, dolly handling assembly 118 may be used to raise dolly wheels 110R, 110L clear of the ground. This is accomplished by lowering handling wheels 120L, 120R while sockets 74R, 74L remain locked to balls 72R, 72L, as shown in FIGS. 9-10. Because handling wheels 120L, 120R are preferably oriented to roll transversely, that is, perpendicularly to longitudinal centerline 105, by pinning rail 9 to ODV frame 14 (with pin 109) so that no relative rotation occurs between the two, the entire aircraft transport vehicle 10 can be made to rotate about vertical axis 16 (as shown by arrow 300) by counter-rotating ODV drive wheels 12R, 12L. Alternatively, as shown in FIG. 9, if ODV 8 is oriented so that ODV horizontal axis 18 is aligned with dolly centerline 105 before rail 9 is pinned to ODV frame 14, aircraft transport vehicle 10 can be made to travel transversely in the direction of arrows 302. In this manner, aircraft transport vehicle 10 can move aircraft, with the aircraft nose in close proximity to objects such as fences and hangers, yet have a clear access and departure path by moving transversely to the aircraft.

As shown in FIG. 8, dolly wheels 110R, 110L are typically non-steerable. However, in an alternative embodiment of the invention, as shown in FIG. 9, dolly wheels 110R, 110L may be mounted on vertical shafts 111R, 111L, respectively, that allow for steering of the wheels. By locking the rotating appendage ring 9 of ODV tractor 8 with locking pin 109 and allowing dolly wheels 110R, 110L to either freely swivel or steer in harmony with the chassis movement of ODV tractor 8, the entire aircraft transport vehicle 10 can be moved in a direction perpendicular to centerline 105. In this manner, it is possible to move the aircraft in a perpendicular direction from the centerline of fuselage and therefore pivot the aircraft on the rear main landing gear without turning the nose landing gear of the aircraft.

Figure 11:
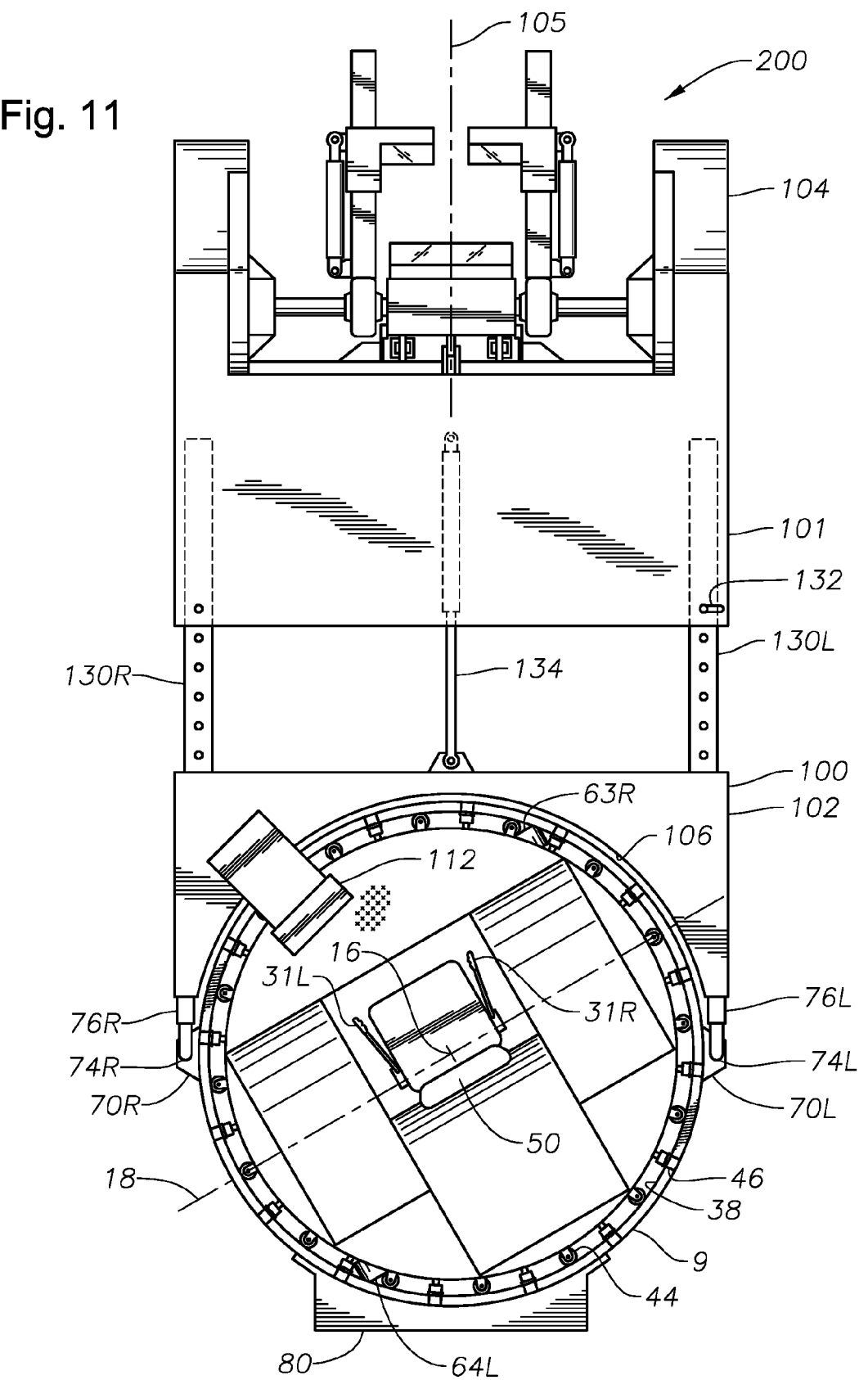
FIG. 11 is a plan view of the coupled aircraft transport vehicle of FIG. 6 shown with the omni-directional tractor rotated counterclockwise and the aircraft lift dolly in a telescopically extended configuration to accommodate aircraft of varying sizes.

FIG. 11 illustrates another alternative embodiment of the invention, in which aircraft lift dolly 100 is longitudinally telescopic to accommodate aircraft of varying sizes, for example. Telescopic frame members 130L, 130R allow the front end 102 of dolly 100 to be moved relative to the rear end 104. One or more pins 132 may be used to lock telescopic frame members 130L, 130R into a given extension position. Alternatively, an actuator 134, such as a hydraulic cylinder-piston arrangement, may be used to selectively extend or retract the length of dolly 100. FIG. 11 also illustrates ODV 8 being rotated counterclockwise with respect to dolly 100 to allow precise positioning of the vehicle 10.

Figure 12:
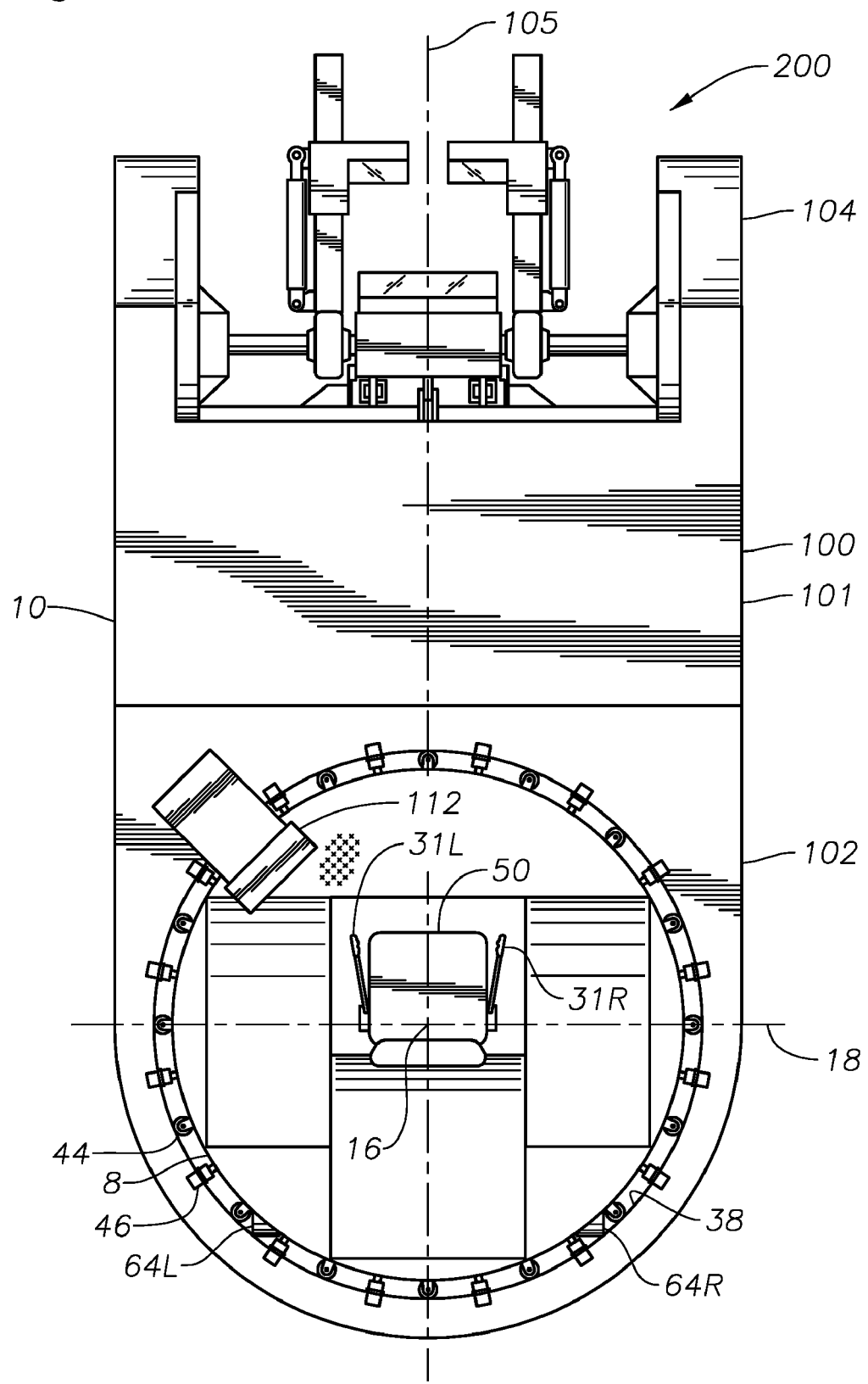
FIG. 12 is a plan view of an aircraft transport vehicle according to an alternative embodiment of the invention showing an omni-directional tractor revolvably and permanently connected to an aircraft left dolly to form a special purpose ground support vehicle.

Although it is preferable that ODV 8 and dolly 100 are separate, disconnectable components, the invention encompasses an aircraft transport tractor wherein the ODV 8 is permanently revolvably connected to the lift dolly 100 to form a specialized vehicle, as shown in FIG. 12.

Figure 13:
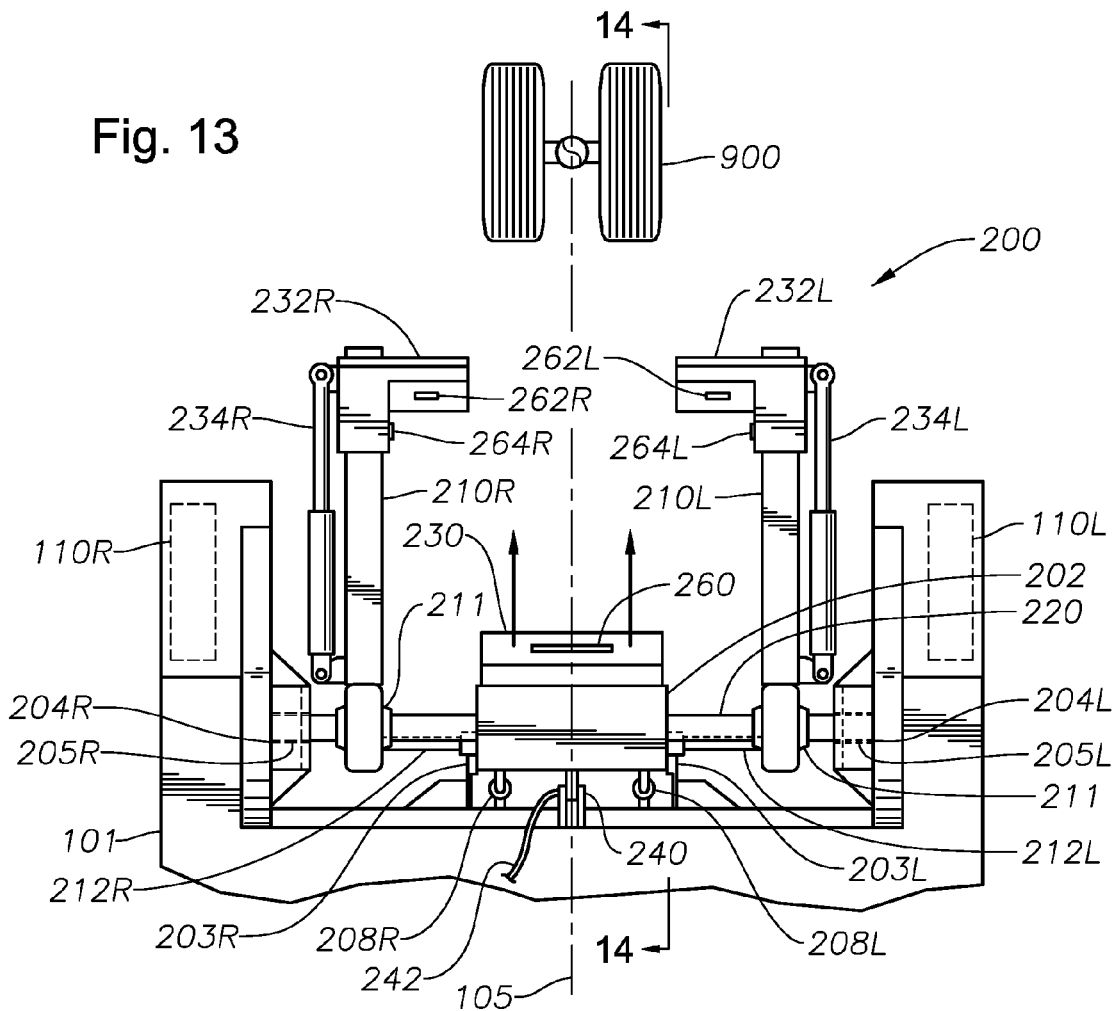
FIG. 13 is a detailed plan view of the aircraft lift mechanism of FIG. 2 according to a preferred embodiment of the invention showing a lift carriage with forward chock and laterally moving support arms carrying longitudinally moving left and right rear chocks.
Figure 14:
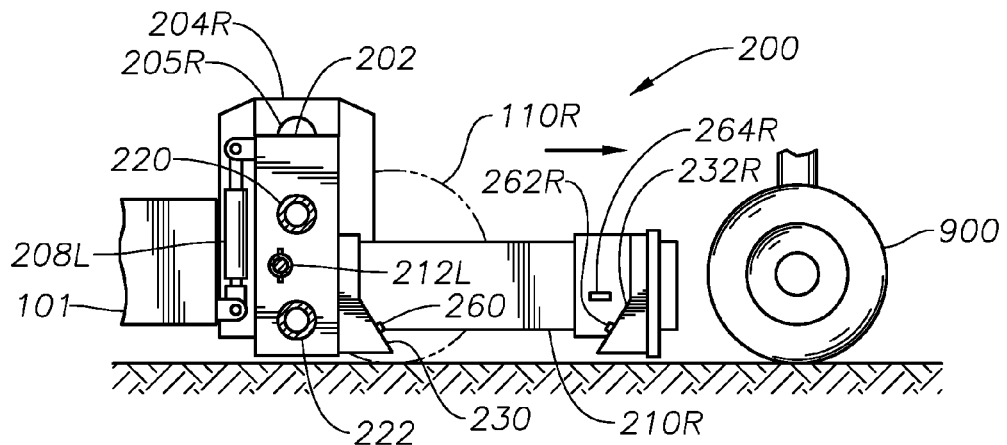
FIG. 14 is a cross section view of the aircraft lift mechanism taken along lines 14-14 of FIG. 13 showing the aircraft transport vehicle and lift mechanism moving toward an aircraft nose gear for receiving and cradling thereof.

FIGS. 8, 13-14 illustrate the structure of aircraft lift assembly 200 according to a preferred embodiment of the invention. The lift assembly 200 includes a lift carriage 202 disposed at the rear 104 of dolly 100 at centerline 105. Lift carriage 202 is slideably captured between guides 203R, 203L, which are in turn mounted to dolly frame 101, so that carriage 202 moves up and down vertically but not transversely. Lift carriage 200 carries one or more horizontally and transversely-oriented rails or shafts 220, 222. The right and left distal ends of shafts 220, 222 are slideably captured in vertical slots 205R, 205L of blocks 204R, 204L, respectively. Blocks 204R, 204L are in turn mounted to dolly frame 101, so that blocks rails 220, 222 move up and down vertically but not longitudinally. Thus, carriage 202, with rails 220, 222, slide only in the vertical direction. Other suitable arrangements to slideably constrain carriage 202 and rails 220, 222 in the vertical direction may be used, such as dovetail or T-slot arrangements. Hydraulic piston-cylinder actuators, 208R, 208L are connected between frame 101 and carriage 202 to selectively vertically move carriage 202 and rails 220, 222. However, other actuators, such as rack and pinion or lead screw arrangements for example, may be used in lieu of piston-cylinder actuators.

Two support arms 210R, 210L are slideably carried by rails 220, 222 for lateral movement between positions near centerline 105 to near the distal ends of lifting rails 220, 222. Linear bearings 211, which preferably employ large bearing rollers that roll along each shaft, support lifting arms 210R, 210L. Because rails 220, 222 are cylindrical, two are used to carry arms 210R, 210L so that the arms cannot pivot downwardly under load. However, a single rail with a splined or rectangular profile, for example, could be used if desired. Hydraulic piston-cylinder actuators 212R, 212L are connected between lift carriage 202 and arms 210R, 210L, respectively, to selectively laterally move arms 210R, 210L. However, other actuator types and arrangements may be used as appropriate.

A forward chock 230 is mounted to the rear wall of lift carriage 202 so that it is raised and lowered with lift carriage 202. Adjustable right and left rear chocks 232R, 232L are moveably carried by support arms 210R, 210L, respectively. Preferably, each arm 210R, 210L acts as a rail upon which its corresponding chock 232R, 232L slides and has a profile that prevents the chock from pivoting. Rear chocks 232R, 232L are moved longitudinally along the length of arms 210R, 210L by hydraulic piston-cylinder actuators 234R, 234L, which are connected between chocks 232R, 232L and arms 210R, 210L, respectively. However, other actuator and chock support arrangements may be used as appropriate.

Figure 15:
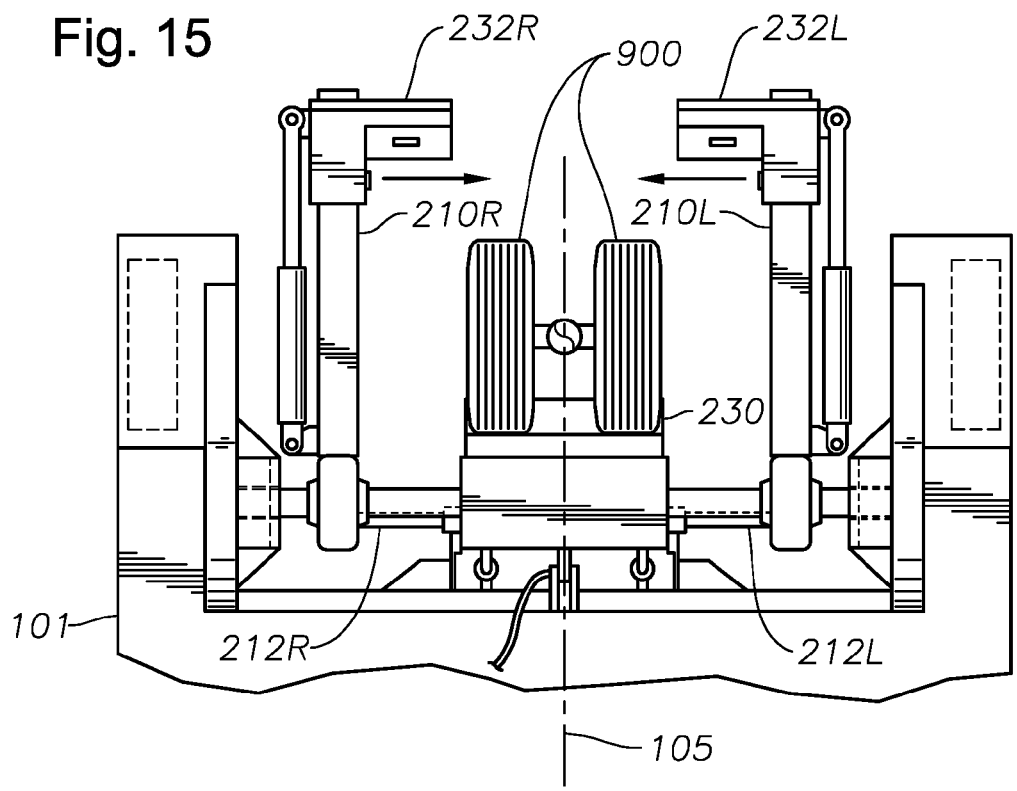
FIG. 15 is a detailed plan view of the aircraft lift mechanism of FIG. 13 showing left and right support arms moving laterally toward the aircraft nose gear.
Figure 16:
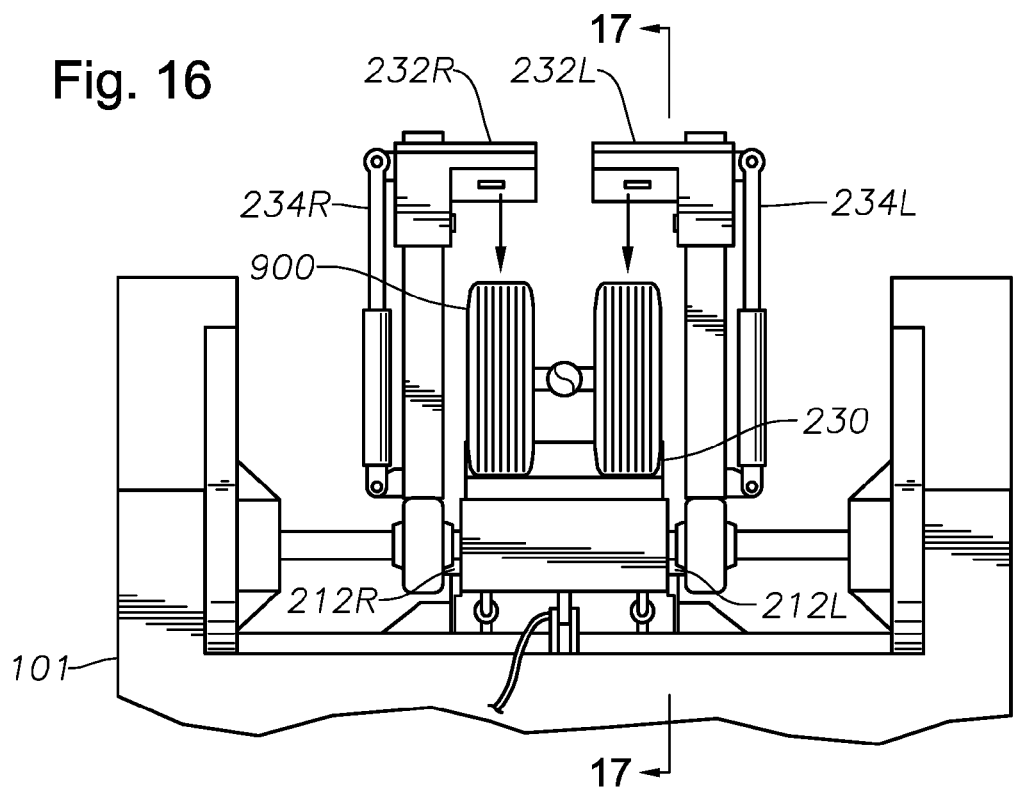
FIG. 16 is a detailed plan view of the aircraft lift mechanism of FIG. 15 showing left and right rear chocks moving longitudinally forward toward the aircraft nose gear.
Figure 17:
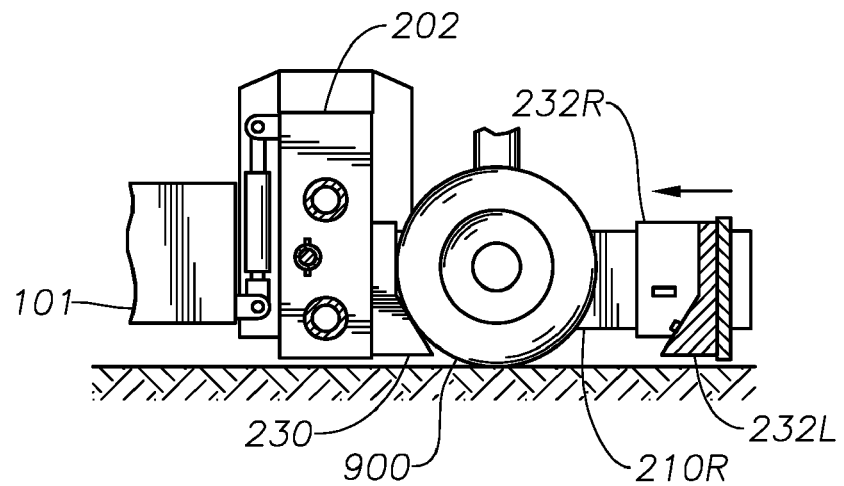
FIG. 17 is a cross section view of the aircraft lift mechanism taken along lines 17-17 of FIG. 16 showing left and right rear chocks moving longitudinally forward toward the aircraft nose gear.
Figure 18:
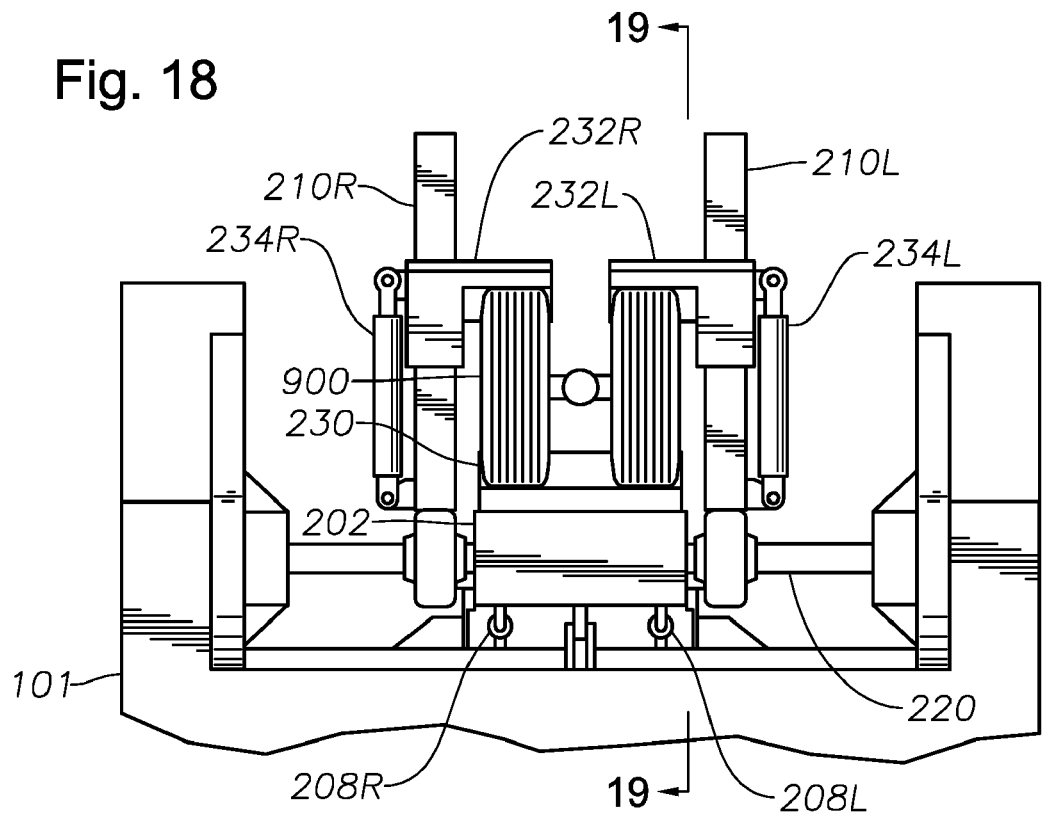
FIG. 18 is a detailed plan view of the aircraft lift mechanism of FIG. 16 showing cradled aircraft nose gear ready for lifting by the lift carriage.
Figure 19:
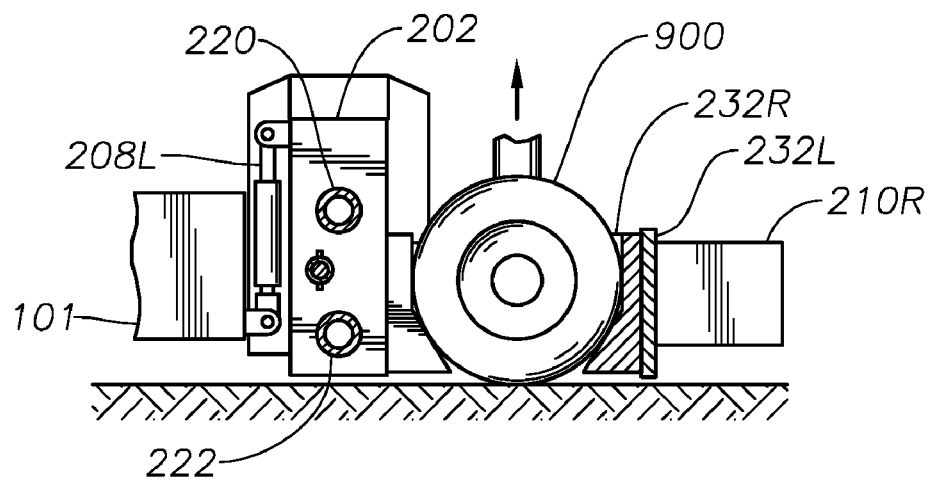
FIG. 19 is a cross section view of the aircraft lift mechanism taken along lines 19-19 of FIG. 18 showing upward movement of the lift carriage and aircraft nose gear.
Figure 20:
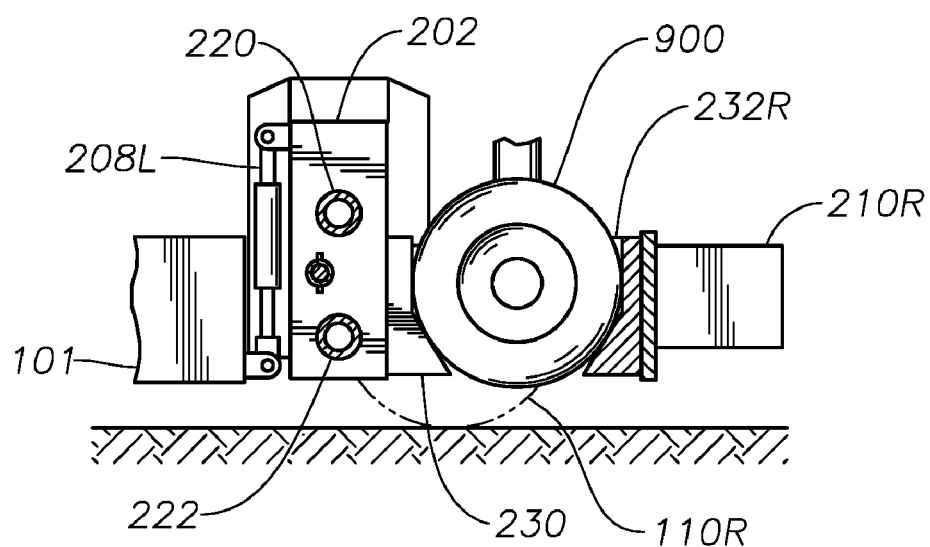
FIG. 20 is the aircraft lift mechanism of FIG. 19 showing a cradled and lifted aircraft nose gear.

FIGS. 13-20 illustrate the operational sequence of capturing and elevating an aircraft nose gear 900. As shown in FIGS. 13-14, aircraft transport vehicle 10 (FIG. 6) is first driven into alignment with nose gear 900 by centering the nose gear 900 with front chock 230 and then moved toward the aircraft until front chock 230 abuts the tire(s) of nose gear 900, as shown in FIG. 15. Referring to FIG. 15, left and right support arms 210L, 210R are then moved toward centerline 105 by actuators 212L, 212R, respectively, until rear chocks 232L, 232R are aligned with the nose gear tire(s), as shown in FIGS. 16-17. Referring to FIG. 16-17, rear chocks 232L, 232R are moved forward by actuators 234L, 234R, until the chocks abut the rear of the tires of nose gear 900, as shown in FIGS. 18-19. Referring to FIGS. 18-19, hydraulic pressure is applied to lifting rams 208L, 208R whereby carriage 202, and rails 220, 222, arms 210L, 210R, and chocks 230, 232L, 232R carried thereby, is lifted, thus lifting aircraft nose gear 900 as shown in FIG. 20.

Referring to FIG. 13, once carriage 202 is raised by hydraulic rams 208R, 208L, a spring-loaded lift lock cam or pin 240 automatically engages and locks carriage 202 in the lifted position. A control cable 242 is ideally attached to locking cam 240 and leads to console 212, thus allowing the operator to release locking cam 240 from his seat 50 for lowering the aircraft back to the ground. Locking cam 240 prevents the carried aircraft from abruptly falling as a result of hydraulic failure during handling or transport.

As shown in FIGS. 13-14, limit switches are installed at contact points 240 on forward chock 230 and 232R, 234R, 232L, 234L on right and left rear chocks 232R, 232L, respectively. These limit switches are connected in series with the electrical circuits that control the motors 26R, 26L (FIG. 2) and hydraulic actuators 212R, 212L, 234R, 234L. The purpose of the limit switches is to limit the travel of any of the moving parts should they come in direct contact with any part of the nose gear 900 of the aircraft. In this manner, an operator can be confident that should any component be out of the line of site, the limit switches will prevent the lifting arms 210R, 210L or chocks 230, 232R, 232L from causing damage to nose gear 900.

Although aircraft lift mechanism 200 as described hereinabove with reference to FIGS. 13-20 is preferably used in conjunction with a lift dolly 100 and/or an ODV 8 tractor, the invention encompasses the aircraft lift mechanism 200 carried by a conventional four-wheeled tractor of prior art. Such a combination provides for faster and safer cradling of aircraft than lifts of prior art, because the aircraft need not be moved for cradling and the operator can perform all required functions from the operators seat.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. An aircraft transport dolly (100) comprising:
   a frame (101) having front and rear ends (102, 104) and defining a frame longitudinal axis (105) intersecting said front and rear ends (102, 104);
   at least one wheel (110R, 110L) rotatively coupled to said frame (101) for supporting at least a portion of the weight of said frame (101);
   two hitch assemblies (74R, 74L) connected to a front portion of said frame (101) for coupling said frame (101) to a tractor (8) at two points separately and equally laterally distant from said frame longitudinal axis;
   a lift carriage (202) vertically movably connected to a rear portion of said frame (101);
   a lift actuator (208R) coupled between said lift carriage (202) and said frame (101) for selectively raising and lowering the elevation of said lift carriage (202) with respect to said frame (101);
   a first arm (210R) horizontally movably carried by said lift carriage (202), said first arm (210R) defining a first arm longitudinal axis and disposed such that said first arm longitudinal axis is substantially parallel to said frame longitudinal axis (105), said first arm (210R) moveable substantially transversely to said frame longitudinal axis (105) with respect to said lift carriage (202);

a second arm (210L) horizontally movably carried by said lift carriage (202), said second arm (210L) defining a second arm longitudinal axis and disposed such that said second arm longitudinal axis is substantially parallel to said frame longitudinal axis (105), said second arm (210L) moveable substantially transversely to said frame longitudinal axis (105) with respect to said lift carriage (202);

a first chock (230) carried by said lift carriage (202); and a second chock (232R) movably carried by said first arm (210R); and a third chock (232L) movably carried by said second arm (210L);

whereby said first chock (230) may be disposed on one side of an aircraft nose gear (900) and said second and third chocks (232R, 232L) may be selectively disposed on the opposite side of said aircraft nose gear (900) to cradle said aircraft nose gear (900) between said first chock (230) and said second and third chocks (232R, 232L), and said lift carriage (202) may be raised, elevating said first, second and third chocks (230, 232R, 232L) and said nose gear (900).

2. The dolly (100) of claim 1 wherein:

said second chock (232R) moveable in a direction substantially parallel to said frame longitudinal axis (105) with respect to said first arm (210R); and said third chock (232L) moveable in a direction substantially parallel to said frame longitudinal axis (105) with respect to said second arm (210L).

3. The dolly (100) of claim 1 further comprising:

a first arm actuator (212R) coupled between said first arm (210R) and said lift carriage (202) for selectively moving said first arm (210R) with respect to said lift carriage (202);

a first chock actuator (234R) coupled between said second chock (232R) and said first arm (210R) for selectively moving said second chock (232R);

a horizontally-oriented rail (220) carried by said lift carriage (202), said first arm (210R) and said second arm (210L) supported by said rail (220);

a second arm actuator (212L) coupled between said second arm (210L) and said lift carriage (202) for selectively moving said second arm (210L) with respect to said lift carriage (202);

a second chock actuator (234L) coupled between said third chock (232L) and said second arm (210L) for selectively moving said third chock (234L).

4. The dolly (100) of claim 1 wherein:

said frame (101) includes a rail (130R) oriented longitudinally with respect to said frame longitudinal axis (105) and disposed between said front end (102) and said rear end (104), said rear end (104) selectively longitudinally telescopically movable with respect to said front end (102) along said rail (130R).

5. The dolly (100) of claim 1 wherein:

each said hitch assembly (74R) is arranged to uncouple said dolly (100) from said tractor (8) when said front portion of said frame (101) is elevated with respect to said tractor (8); and said dolly (100) further includes a dolly handling mechanism (118) coupled to said front portion of said frame (101) and arranged to lift said front portion of said frame (101) for uncoupling said dolly (100) from said tractor (8).

6. The dolly (100) of claim 5 wherein:

aid dolly handling mechanism (118) includes a handling wheel (120R) oriented perpendicularly to said frame longitudinal axis (105), whereby said handling wheel (120R) can be lowered with respect to said frame (101) to raise said at least one wheel (110R, 110L) to allow said dolly (100) to be moved in a direction perpendicular to said frame longitudinal axis (105).

7. An aircraft transport vehicle (10) comprising:

a frame (101) having front and rear ends (102, 104) and defining a frame longitudinal axis (105) intersecting said front and rear ends (102, 104);

two hitch assemblies (74R, 74L) connected to said front end of said frame (101) for coupling said frame (101) to a tractor section (8) at two points separately and equally laterally distant from said frame longitudinal axis;

a plurality of wheels (110R, 110L, 12R, 12L) rotatively coupled to said frame (101) for supporting the weight of the vehicle (10);

a lift carriage (202) vertically movably connected to a rear portion of said frame (101);

a lift actuator (208R) coupled between said lift carriage (202) and said frame (101) for selectively raising and lowering the elevation of said lift carriage (202) with respect to said frame (101);

a first arm (210R) horizontally movably carried by said lift carriage (202); said first arm (210R) defining a first arm longitudinal axis and disposed such that said first arm longitudinal axis is substantially parallel to said frame longitudinal axis (105), said first arm (210R) moveable substantially transversely to said frame longitudinal axis (105) with respect to said lift carriage (202);

a second arm (210L) horizontally movably carried by said lift carriage (202), said second arm (210L) defining a second arm longitudinal axis and disposed such that said second arm longitudinal axis is substantially parallel to said frame longitudinal axis (105), said second arm (210L) moveable substantially transversely to said frame longitudinal axis (105) with respect to said lift carriage (202);

a first chock (230) carried by said lift carriage (202); and a second chock (232R) movably carried by said first arm (210R); and a third chock (232L) movably carried by said second arm (210L);

whereby said first chock (230) may be disposed on one side of an aircraft nose gear (900) and said second and third chocks (232R, 232L) may be selectively disposed on the opposite side of said aircraft nose gear (900) and said lift carriage (202) may be raised, elevating said first and second chocks (230, 232R) and said nose gear (900).

8. The vehicle (10) of claim 7 wherein:

said second (232R) moveable in a direction substantially parallel to said frame longitudinal axis (105) with respect to said first arm (210R); and said third chock (232L) moveable in a direction substantially parallel to said frame longitudinal axis (105) with respect to said second arm (210L).

9. The vehicle (10) of claim 7 further comprising:

a first arm actuator (212R) coupled between said first arm (210R) and said lift carriage (202) for selectively moving said first arm (210R) with respect to said lift carriage (202);

a first chock actuator (234R) coupled between said second chock (232R) and said first arm (210R) for selectively moving said second chock (232R);

a horizontally-oriented rail (220) carried by said lift carriage (202), said first arm (210R) and said second arm (210L) carried by said rail (220);

a second arm actuator (212L) coupled between said second arm (210L) and said lift carriage (202) for selectively moving said second arm (210L) with respect to said lift carriage (202); and a second chock actuator (234L) coupled between said third chock (232L) and said second arm (210L) for selectively moving said third chock (232L).

10. The vehicle (10) of claim 7 wherein:

said frame (101) includes a rail (130R) oriented longitudinally with respect to said frame longitudinal axis (105) and disposed between said front end (102) and said rear end (104), said rear end (104) selectively longitudinally telescopically movable with respect to said front end (102) along said rail (130R).

11. The vehicle (10) of claim 7 wherein:

first and second of said plurality of wheels (12R, 12L) are independently powered drive wheels disposed about a common horizontal axis (18) that bisects a vertical axis (16), said first and second of said plurality of wheels (12R, 12L) arranged to revolve 360 degrees about said vertical axis (16) with respect to said lift carriage (202).

12. The vehicle of (10) claim 7 wherein:

a front portion of said vehicle (10) is selectively disconnectable from said rear portion; and said front portion defines a tractor (8).

13. In a service vehicle (10) including an omni-directional vehicle (8) characterized by having first and second independently powered drive wheels (12R, 12L) rotatably disposed along a horizontal axis (18) and designed and arranged to revolve 360 degrees about a central vertical axis (16) which intersects said horizontal axis (18) between said first and second drive wheels (12R, 12L), the improvement comprising:

an aircraft transport dolly (100) having a frame (101), a front end (102) revolvably connected to said omni-directional vehicle (8), and a rear end (104) having and least one dolly wheel (110R, 110L), said front end and said rear end defining a frame longitudinal axis (105) intersecting said front and rear ends (102, 104), and carrying an aircraft lift mechanism (200) designed and arranged for receiving a nose gear (900) of an aircraft and selectively elevating said nose gear (900) with respect to said service vehicle (10), said dolly (100) defining a frame longitudinal axis (105) intersecting said front and rear ends (102, 104), two hitch assemblies (74R, 74L) connected to said front portion of said frame (101) for coupling said frame (101) to said omni-directional vehicle (8) at two points separately and equally laterally distant from said longitudinal axis (105); said aircraft lift mechanism having a lift carriage and having a first arm horizontally movably carried by said lift carriage, said first arm (210R) defining a first arm longitudinal axis and disposed such that said first arm longitudinal axis is substantially parallel to said frame longitudinal axis (105), said first arm (210R) moveable substantially transversely to said frame longitudinal axis (105) with respect to said lift carriage (202), and a second arm (210L) horizontally movably carried by said lift carriage (202), said second arm (210L) defining a second arm longitudinal axis and disposed such that said second arm longitudinal axis is substantially parallel to said frame longitudinal axis (105), said second arm (210L) moveable substantially transversely to said frame longitudinal axis (105) with respect to said lift carriage (202).

14. The vehicle (10) of claim 13 further comprising:

a ring (9) encircling said omni-directional vehicle (8) and revolvably coupled thereto by a plurality of engaging elements (44, 46, 47) generally circuminterspersed therebetween, said dolly (100) connected to said ring (9);

whereby the generally circuminterspersed position between said omni-directional vehicle (8) and said ring (9) of said plurality of engaging elements (44, 46, 47) provides a loading that is generally evenly distributed about the perimeter of said omni-directional vehicle so that said dolly (100) revolves freely with respect to said omni-directional vehicle (8).

15. The vehicle (10) of claim 13 wherein:

said frame (101) includes at least one wheel (110R, 110L) rotatively coupled to said frame (101) for supporting at least a portion of the weight of the frame (101);

said lift carriage (202) vertically movably connected to a rear portion of said frame (101) and includes, a first arm actuator (212R) coupled between said first arm (210R) and said lift carriage (202) for selectively moving said first arm (210R) with respect to said lift carriage (202), a first chock (230) carried by said lift carriage (202), a second chock (232R) movably carried by said first arm (210R), and a first chock actuator (234R) coupled between said second chock (232R) and said first arm (210R) for selectively moving said second chock (232R), a second arm actuator (212L) coupled between said second arm (210L) and said lift carriage (202) for selectively moving said first arm (210R and said second arm respect to said lift carriage (202), a third chock (232L) movably carried by said second arm (210L), a first chock actuator (234R) coupled between said second chock (232R) and said first arm (210R) for selectively moving said second chock (232R), a second chock actuator (234L) coupled between said third chock (232L) and said second arm (210L) for selectively moving said third chock (232L);

said first arm (210R) defines a first arm longitudinal axis and is disposed such that said first arm longitudinal axis is substantially parallel to said frame longitudinal axis (105);

said first arm (210R) is arranged to move substantially transversely to said frame longitudinal axis (105) with respect to said lift carriage (202); and said second chock (232R) is arranged to move in a direction substantially parallel to said frame longitudinal axis (105) with respect to said first arm (210R);

said second arm (210L) defines a second arm longitudinal axis and is disposed such that said second arm longitudinal axis is substantially parallel to said frame longitudinal axis (105);

said second arm (210L) is arranged to move substantially transversely to said frame longitudinal axis (105) with respect to said lift carriage (202); and said third chock (232L) is arranged to move in a direction substantially parallel to said frame longitudinal axis (105) with respect to said second arm (210R);

whereby said first chock (230) may be disposed on one side of an aircraft nose gear (900) and said second and third chocks (232R, 232L)) may be disposed on the opposite side of said aircraft nose gear (900) and said lift carriage (202) may be raised, elevating said first, second, and third chocks (230, 232R, 232L) and said nose gear (900).

16. The vehicle (10) of claim 15 further comprising:

a horizontally-oriented rail (220) carried by said lift carriage (202), said first arm (210R) carried by said rail (220);

a second chock actuator (234L) coupled between said third chock (232L) and said second arm (210L) for selectively moving said third chock (232L).

17. The vehicle (10) of claim 13 wherein: said frame (101) includes a rail (130R) oriented longitudinally with respect to said frame longitudinal axis (105) and disposed between said front end (102) and said rear end (104), said rear end (104) selectively longitudinally telescopically movable with respect to said front end (102) along said rail (130R).

18. The vehicle (10) of claim 13 wherein:
said hitch assembly (70R, 72R, 74R) is arranged to uncouple said dolly (100) from said omni-directional vehicle (8) when a front portion of said frame (101) is elevated with respect to said omni-directional vehicle (8);
said dolly (100) further includes a dolly handling mechanism (118) coupled to said front portion of said frame (101) and arranged to lift said front portion of said frame (101) for uncoupling said dolly (100) from said tractor (8) or to lift said at least one dolly wheel (110R, 110L) clear of the ground; and
said dolly handling mechanism includes a handling wheel (120R) oriented perpendicularly to said frame longitudinal axis (105).

19. In a service vehicle (10) including an omni-directional vehicle (8) characterized by having a first and second independently powered drive wheels (12R, 12L) rotatably disposed along a horizontal axis (18) and designed and arranged to revolve 360 degrees about a central vertical axis (16) which intersects said horizontal axis (18) between said first and second drive wheels (12R, 12L), the improvement comprising:

a hitch coupled to said omni-directional vehicle, and
an aircraft transport dolly (100) having a frame (101), a front end (102) slideably connected to said hitch, and a rear end (104), said front end (102) and said rear end (14)) defining a frame longitudinal axis (105) intersecting said front and rear ends (102, 104), having at least one dolly wheel (110R, 110L) and carrying an aircraft lift mechanism (200) designed and arranged for moving the nose gear of an aircraft vertically for transporting said aircraft said aircraft lift mechanism having a lift carriage and having a first arm horizontally movably carried by said lift carriage,
at least one hitch assembly (74R, 74L) at said front end of said frame (101) for coupling said frame (101) to said omni-directional vehicle (8) and fixedly contacting said omni-directional vehicle at two points separately and equally laterally distant from said longitudinal axis (105);
said first arm (210R) defining a first arm longitudinal axis and disposed such that said first arm longitudinal axis is substantially parallel to said frame longitudinal axis (105), said first arm (210R) moveable substantially transversely to said frame longitudinal axis (105) with respect to said lift carriage (202); and
a second arm (210L) movably carried by said lift carriage (202), said second arm (210L) defining a second arm longitudinal axis and disposed such that said second arm longitudinal axis is substantially parallel to said frame longitudinal axis (105), said second arm (210L) moveable substantially transversely to said frame longitudinal axis (105) with respect to said lift carriage (202).

* * * * *